(12) United States Patent
Hogan

(10) Patent No.: US 8,773,370 B2
(45) Date of Patent: Jul. 8, 2014

(54) TABLE EDITING SYSTEMS WITH GESTURE-BASED INSERTION AND DELETION OF COLUMNS AND ROWS

(75) Inventor: Edward P. A. Hogan, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 994 days.

(21) Appl. No.: 12/835,700

(22) Filed: Jul. 13, 2010

(65) Prior Publication Data
US 2012/0013540 A1    Jan. 19, 2012

(51) Int. Cl.
*G06F 3/041* (2006.01)

(52) U.S. Cl.
USPC ............ 345/173; 345/156; 715/252; 715/863

(58) Field of Classification Search
USPC .................. 345/156–178; 715/863, 206–256
See application file for complete search history.

(56) References Cited

U.S. PATENT DOCUMENTS

| | | | |
|---|---|---|---|
| 5,252,951 A | 10/1993 | Tannenbaum et al. | |
| 5,347,295 A | 9/1994 | Agulnick et al. | |
| 5,502,803 A * | 3/1996 | Yoshida et al. | 715/201 |
| 5,677,710 A | 10/1997 | Thompson-Rohrlich | |
| 5,717,939 A * | 2/1998 | Bricklin et al. | 715/212 |
| 5,848,187 A | 12/1998 | Bricklin et al. | |
| 6,380,931 B1 | 4/2002 | Gillespie et al. | |
| 6,525,749 B1 * | 2/2003 | Moran et al. | 715/863 |
| 7,028,256 B2 * | 4/2006 | Altman et al. | 715/256 |
| 7,479,949 B2 | 1/2009 | Jobs et al. | |
| 7,536,656 B2 | 5/2009 | Hullender et al. | |
| 7,577,925 B2 | 8/2009 | Zotov et al. | |
| 7,627,834 B2 | 12/2009 | Rimas-Ribikauskas et al. | |
| 7,735,007 B2 * | 6/2010 | Altman et al. | 715/244 |
| 7,735,008 B2 * | 6/2010 | Altman et al. | 715/244 |
| 7,864,195 B2 * | 1/2011 | Rimas et al. | 345/619 |
| 8,195,641 B2 * | 6/2012 | Rucker et al. | 707/713 |
| 8,286,101 B2 | 10/2012 | Kupka | |
| 2003/0212958 A1 * | 11/2003 | Altman et al. | 715/517 |
| 2005/0052427 A1 | 3/2005 | Wu et al. | |

(Continued)

FOREIGN PATENT DOCUMENTS

DE   20 2007 014957   12/2007
EP   0 840 200 A2   5/1998

(Continued)

OTHER PUBLICATIONS

Hogan et al., U.S. Appl. No. 12/835,697, filed Jul. 13, 2010.

(Continued)

*Primary Examiner* — Gregory J Tryder
(74) *Attorney, Agent, or Firm* — Morrison & Foerster LLP

(57) ABSTRACT

Computing equipment may display tables of data that contain rows and columns. Touch gestures such as hold and flick gestures may be detected using a touch screen or other touch sensor. In response to a detected hold portion of a hold and flick gesture, a row or column in a table may be selected. In response to detection of a simultaneous flick portion, columns or rows may be inserted or deleted. A column may be inserted after a selected column using a hold and right downflick gesture. A hold and left downflick gesture may be used to insert a column before a selected column. Rows may be inserted before and after selected rows using hold and upper rightflick and hold and lower rightflick gestures. One or more columns or rows may be deleted using upflick or leftflick gestures.

27 Claims, 30 Drawing Sheets

(56) References Cited

U.S. PATENT DOCUMENTS

| | | | |
|---|---|---|---|
| 2005/0120293 A1* | 6/2005 | Benhase et al. | 715/504 |
| 2005/0120302 A1* | 6/2005 | Altman et al. | 715/530 |
| 2006/0117254 A1* | 6/2006 | Altman et al. | 715/518 |
| 2006/0123336 A1* | 6/2006 | Altman et al. | 715/518 |
| 2006/0125803 A1 | 6/2006 | Westerman et al. | |
| 2006/0150078 A1 | 7/2006 | Brookler et al. | |
| 2006/0210958 A1 | 9/2006 | Rimas-Ribikauskas et al. | |
| 2007/0050697 A1* | 3/2007 | Lewis-Bowen et al. | 715/503 |
| 2008/0036743 A1 | 2/2008 | Westerman et al. | |
| 2008/0165141 A1 | 7/2008 | Christie | |
| 2008/0165149 A1 | 7/2008 | Platzer et al. | |
| 2008/0168403 A1 | 7/2008 | Westerman et al. | |
| 2008/0168405 A1 | 7/2008 | Tolmasky et al. | |
| 2008/0297482 A1 | 12/2008 | Weiss | |
| 2008/0309632 A1 | 12/2008 | Westerman et al. | |
| 2009/0044139 A1* | 2/2009 | Shin et al. | 715/769 |
| 2009/0083614 A1 | 3/2009 | Wedekind | |
| 2009/0125848 A1 | 5/2009 | Keohane et al. | |
| 2009/0174675 A1 | 7/2009 | Gillespie et al. | |
| 2009/0228792 A1 | 9/2009 | van Os et al. | |
| 2009/0284479 A1 | 11/2009 | Dennis et al. | |
| 2009/0327976 A1 | 12/2009 | Williamson et al. | |
| 2010/0031203 A1* | 2/2010 | Morris et al. | 715/863 |
| 2010/0077354 A1* | 3/2010 | Russo | 715/834 |
| 2010/0103124 A1 | 4/2010 | Kruzeniski et al. | |
| 2010/0162181 A1 | 6/2010 | Shiplacoff et al. | |
| 2010/0289752 A1 | 11/2010 | Birkler | |
| 2011/0231796 A1* | 9/2011 | Vigil | 715/810 |

FOREIGN PATENT DOCUMENTS

| | | |
|---|---|---|
| EP | 1 615 109 A2 | 1/2006 |
| EP | 1 983 416 A1 | 10/2008 |
| WO | WO 2007/037806 A1 | 4/2007 |

OTHER PUBLICATIONS

Kim, "On-Line Gesture Recognition by Feature Analysis", Computer Vision and Shape Recognition, Feb. 1989, pp. 209-223, Series in Computer Science—vol. 14.

Eglowstein, "Reviews: Roundup Applying the Power of the Pen—Nine pen-centric applications, from spreadsheets to note-takers, challenge the notion that pens are just for vertical markets", Jul. 1993, BYTE.

Mantel, "Go Figure With a Pen", Datamation, May 1992.

Palm Inc., "Palm Pre Phone User Guide," Sprint, 2009, pp. 41-51 and 165-175.

SavySoda, "Documents 2 by SavySoda," May 6, 2009, http://web.archive.org/web/20090506223817/http://www.savysoda.com/Documents2/, 5 pages.

European Search Report and Written Opinion dated Jul. 8, 2011, received in European Patent Application No. 11150220.9, which corresponds to U.S. Appl. No. 12/789,425, 9 pages. (Hogan).

Invitation to Pay Additional Fees dated Jul. 13, 2011, received in International Patent Application No. PCT/US2010/062588, which corresponds to U.S. Appl. No. 12/789,425, 5 pages (Hogan).

International Search Report and Written Opinion dated Dec. 14, 2011, received in U.S. Appl. No. 12/789,425, 37 pages (Hogan).

Office Action dated Jan. 10, 2013, received in U.S. Appl. No. 12/789,425, 41 pages (Hogan).

Final Office action dated Aug. 26. 2013, received in U.S. Appl. No. 12/789,425, 40 pages (Hogan).

Office Action dated Oct. 30, 2012, received in Chinese Patent Application No. 201110079357.X, which corresponds to U.S. Appl. No. 12/789,425, 9 pages (Hogan).

* cited by examiner

|   | A | B | C | D | E | F | G |
|---|---|---|---|---|---|---|---|
| 1 |   | UCH1 | UCH2 |   | UCH3 | UCH4 |   |
| 2 | URH2 | D11 | D12 |   | D13 | D14 |   |
| 3 | URH3 | D21 | D22 |   | D23 | D24 |   |
| 4 | URH4 | D31 | D32 |   | D33 | D34 |   |
| 5 | URH5 | D41 | D42 |   | D43 | D44 |   |

FIG. 14

|   | A | B | C | D | E | F |
|---|---|---|---|---|---|---|
| 1 |   | UCH1 |   | UCH2 | UCH3 | UCH4 |
| 2 | URH2 | D11 |   | D12 | D13 | D14 |
| 3 | URH3 | D21 |   | D22 | D23 | D24 |
| 4 | URH4 | D31 |   | D32 | D33 | D34 |
| 5 | URH5 | D41 |   | D42 | D43 | D44 |

FIG. 16

|   | A | B | C | D | E |
|---|---|---|---|---|---|
| 1 |   | UCH1 | UCH2 | UCH3 | UCH4 |
| 2 | URH2 | D11 | D12 | D13 | D14 |
| 3 | URH3 | D21 | D22 | D23 | D24 |
| 4 | URH4 | D31 | D32 | D33 | D34 |
| 5 |   |   |   |   |   |

FIG. 17

|   | A | B | C | D | E | F |
|---|---|---|---|---|---|---|
| 1 |   | UCH1 | UCH3 | UCH4 |   |   |
| 2 | URH2 | D11 | D13 | D14 |   |   |
| 3 | URH3 | D21 | D23 | D24 |   |   |
| 4 | URH4 | D31 | D33 | D34 |   |   |
| 5 | URH5 | D41 | D43 | D44 |   |   |

FIG. 23

|   | A | B | C | D | E | F |
|---|---|---|---|---|---|---|
| 1 |   | UCH1 | UCH2 | UCH3 | UCH4 |   |
| 2 | URH2 | D11 | D12 | D13 | D14 |   |
| 3 | URH3 | D21 | D22 | D23 | D24 |   |
| 4 | URH4 | D31 | D32 | D33 | D34 |   |
| 5 | URH5 | D41 | D42 | D43 | D44 |   |

FIG. 24

|   | A | B | C | D | E | F |
|---|---|---|---|---|---|---|
| 1 |   | UCH1 | UCH4 |   |   |   |
| 2 | URH2 | D11 | D14 |   |   |   |
| 3 | URH3 | D21 | D24 |   |   |   |
| 4 | URH4 | D31 | D34 |   |   |   |
| 5 | URH5 | D41 | D44 |   |   |   |

FIG. 25

|   | A | B | C | D | E |
|---|---|---|---|---|---|
| 1 |   | UCH1 | UCH2 | UCH3 | UCH4 |
| 2 | URH2 | D11 | D12 | D13 | D14 |
| 3 | URH4 | D31 | D32 | D33 | D34 |
| 4 |   |   |   |   |   |
| 5 |   |   |   |   |   |

|   | A | B | C | D | E |
|---|---|---|---|---|---|
| 1 |   | UCH1 | UCH2 | UCH3 | UCH4 |
| 2 | URH2 | D11 | D12 | D13 | D14 |
| 3 | URH3 | D21 | D22 | D23 | D24 |
| 4 | URH4 | D31 | D32 | D33 | D34 |
| 5 |   |   |   |   |   |

FIG. 28

|   | A | B | C | D | E |
|---|---|---|---|---|---|
| 1 |   | UCH1 | UCH2 | UCH3 | UCH4 |
| 2 | URH4 | D31 | D32 | D33 | D34 |
| 3 |   |   |   |   |   |
| 4 |   |   |   |   |   |
| 5 |   |   |   |   |   |

TABLE EDITING SYSTEMS WITH GESTURE-BASED INSERTION AND DELETION OF COLUMNS AND ROWS

BACKGROUND

This relates generally to systems for manipulating data, and, more particularly, to systems in which gestures may be used to manipulate rows and columns of data items in an array.

Electronic devices such as computers and handheld devices are often used to manipulate data. For example, electronic devices may be used to run spreadsheet applications that allow users to manipulate rows and columns of data. Electronic devices may also be used to implement operating systems and other software in which rows and columns are manipulated.

In some electronic devices, touch sensors are used to gather user input. For example, pen-based computers may gather input from a stylus. Tablet computers and other devices with touch screens may receive user input in the form of gestures made with a user's fingertips on a touch screen. Some devices may gather user touch input using a touch pad.

Conventional electronic devices in which data is presented to a user may sometimes allow the data to be manipulated using touch gestures. Such touch gestures may not, however, be practical in many circumstances. For example, conventional devices may not support gestures for inserting and deleting rows and columns in a table or may only support complex and cumbersome gestures.

It would therefore be desirable to provide a way in which to address the shortcomings of conventional schemes for inserting and deleting rows and columns.

SUMMARY

Computing equipment may include one or more electronic devices such as tablet computers, computer monitors, cellular telephones, and other electronic equipment. The computing equipment may include touch screen displays and other components with touch sensor arrays. A user may control operation of the computing equipment by supplying user input commands in the form of touch gestures.

Tables of data containing rows and columns may be displayed on a display in the computing equipment. A user may use gestures such as hold and flick gestures to manipulate rows and columns. In each hold and flick gesture, the hold portion of the gesture may be made by a persistent touch contact on a desired portion of a touch sensor. The flick portion of the hold and flick gesture may be made while the hold portion of the gesture is being made. Simultaneous hold and flick gestures of this type include a hold portion that can be used to select rows and columns in the array and an overlapping flick portion that may be used to perform associated row and column insertion and deletion operations.

Hold and flick gestures may be characterized by the direction of the flick portion of the gesture (i.e., up for an upflick, down for a downflick, left for a leftflick, or right for a rightflick). Hold and flick gestures may also be characterized by the relative position of the flick portion of the gesture relative to the hold portion of the gesture. For example, a right downflick or upflick may be detected when a user makes a downflick or upflick gesture on a portion of a touch sensor that is located to the right of the hold gesture, a left downflick or upflick may be detected when a user makes a downflick or upflick gesture at a location to the left of the hold gesture, an upper rightflick or leftflick gesture may be detected when a rightflick or leftflick gesture is made above a hold gesture, and a lower rightflick or leftflick gesture may be detected when a rightflick or leftflick gesture is made below a hold gesture.

Gestures such as these may be associated with particular table manipulation activities. For example, a hold and right downflick may be used to insert a column after a selected column in a table, a hold and left downflick may be used to insert a column before a selected column in a table, a hold and lower rightflick may be used to insert a row after a selected row, and a hold an upper rightflick may be used to insert a row before a selected row. Deletions of rows and columns may be performed using hold and leftflick gestures (e.g., to delete one or more rows) and hold and upflick gestures (e.g., to delete one or more columns).

Tables may be displayed on a display during table manipulation operations. Updated versions of the tables may be displayed and database information may be updated in response to each detected and processed hold and flick gesture. Gesture recognizer code may be implemented as part of an operating system or as part of an application or other software. Touch data may be processed within an operating system and within applications on the computing equipment using the gesture recognizer code.

Further features of the invention, its nature and various advantages will be more apparent from the accompanying drawings and the following detailed description of the preferred embodiments.

BRIEF DESCRIPTION OF THE DRAWINGS

FIG. 14 shows how a column may be inserted in the table of FIG. 13 after the selected column in response to detection of the hold and right downflick gesture in accordance with the present invention.

FIG. 16 shows how a column may be inserted in the table of FIG. 15 before the selected column in response to detection of the hold and left downflick gesture in accordance with the present invention.

FIG. 17 shows an illustrative table of data that may be presented to a user of computing equipment in accordance with an embodiment of the present invention.

FIG. 23 shows how the selected column of data may be deleted from the table of FIG. 22 in response to detection of the hold and right upflick gesture in accordance with an embodiment of the present invention.

FIG. 24 shows how a hold and right upflick gesture may be used to instruct a table editing system to delete multiple selected columns from a table in accordance with an embodiment of the present invention.

FIG. 25 shows how the selected columns of data may be deleted from the table of FIG. 24 in response to detection of the hold and right upflick gesture in accordance with an embodiment of the present invention.

FIG. 28 shows how a hold and leftflick gesture may be used to instruct a table editing system to delete multiple selected rows from a table in accordance with an embodiment of the present invention.

DETAILED DESCRIPTION

Figure 1:
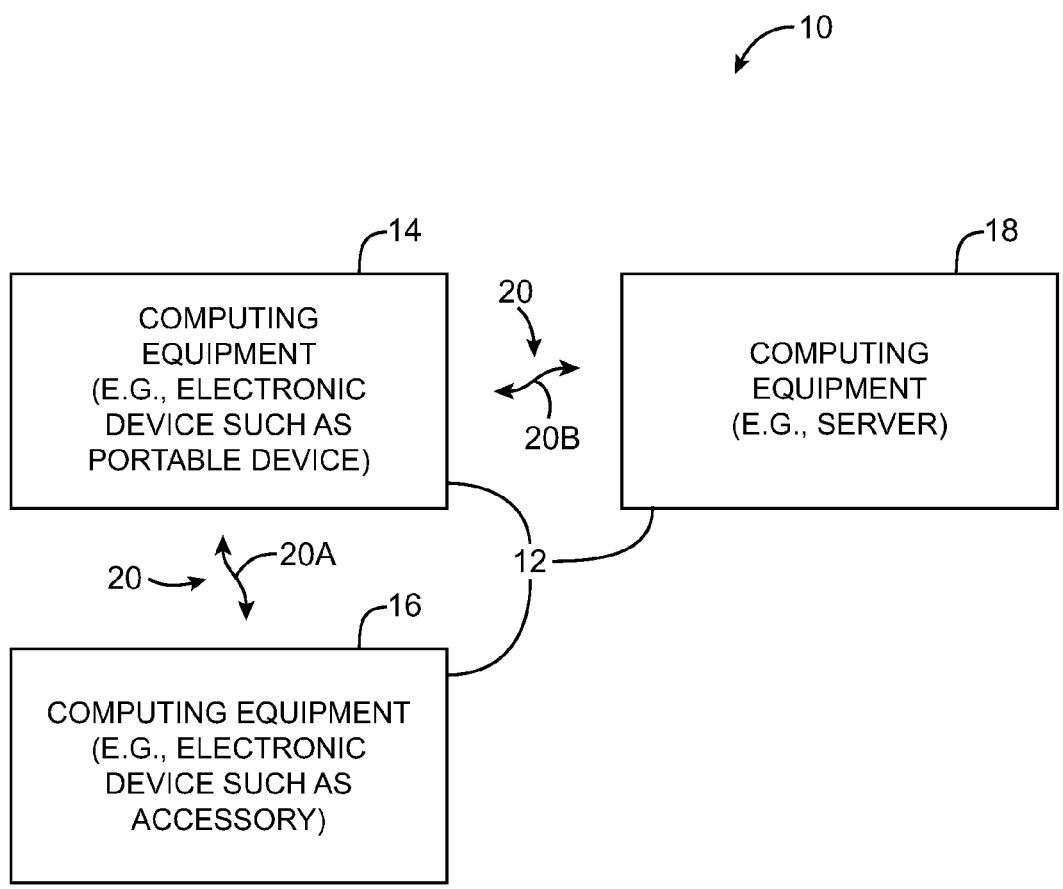
FIG. 1 is schematic diagram of an illustrative system in which data may be edited using gestured-based commands in accordance with an embodiment of the present invention.

An illustrative system of the type that may be used to manipulate tables containing rows and columns of data is shown in FIG. 1. As shown in FIG. 1, system 10 may include computing equipment 12. Computing equipment 12 may include one or more pieces of electronic equipment such as equipment 14, 16, and 18. Equipment 14, 16, and 18 may be linked using one or more communications paths 20.

Computing equipment 12 may include one or more electronic devices such as desktop computers, servers, mainframes, workstations, network attached storage units, laptop computers, tablet computers, cellular telephones, media players, other handheld and portable electronic devices, smaller devices such as wrist-watch devices, pendant devices, headphone and earpiece devices, other wearable and miniature devices, accessories such as mice, touch pads, or mice with integrated touch pads, joysticks, touch-sensitive monitors, or other electronic equipment.

Software may run on one or more pieces of computing equipment 12. In some situations, most or all of the software used to implement table manipulation functions may run on a single platform (e.g., a tablet computer with a touch screen). In other situations, some of the software runs locally (e.g., as a client implemented on a laptop), whereas other software runs remotely (e.g., using a server implemented on a remote computer or group of computers). When accessories such as accessory touch pads are used in system 10, some equipment 12 may be used to gather touch input, other equipment 12 may be used to run a local portion of a program, and yet other equipment 12 may be used to run a remote portion of a program. Other configurations such as configurations involving four or more different pieces of computing equipment 14 may be used if desired.

With one illustrative scenario, computing equipment 14 of system 10 may be based on an electronic device such as a computer (e.g., a desktop computer, a laptop computer or other portable computer, a handheld device such as a cellular telephone with computing capabilities, etc.). In this type of scenario, computing equipment 16 may be, for example, an optional electronic device such as a pointing device or other user input accessory (e.g., a touch pad, a touch screen monitor, etc.). Computing equipment 14 (e.g., an electronic device) and computing equipment 16 (e.g., an accessory) may communicate over communications path 20A. Path 20A may be a wired path (e.g., a Universal Serial Bus path or FireWire path) or a wireless path (e.g., a local area network path such as an IEEE 802.11 path or a Bluetooth® path). Computing equipment 14 may interact with computing equipment 18 over communications path 20B. Path 20B may include local wired paths (e.g., Ethernet paths), wired paths that pass through local area networks and wide area networks such as the internet, and wireless paths such as cellular telephone paths and wireless local area network paths (as an example). Computing equipment 18 may be a remote server or a peer device (i.e., a device similar or identical to computing equipment 14). Servers may be implemented using one or more computers and may be implemented using geographically distributed or localized resources.

In an arrangement of the type in which equipment 16 is a user input accessory such as an accessory that includes a touch sensor array, equipment 14 is a device such as a tablet computer, cellular telephone, or a desktop or laptop computer with a touch sensitive screen, and equipment 18 is a server, user input commands may be received using equipment 16 and equipment 14. For example, a user may supply a touch-based gesture to a touch pad or touch screen associated with accessory 16 or may supply a touch gesture to a touch pad or touch screen associated with equipment 14. Gesture recognition functions may be implemented on equipment 16 (e.g., using processing circuitry in equipment 16), on equipment 14 (e.g., using processing circuitry in equipment 14), and/or in equipment 18 (e.g., using processing circuitry in equipment 18). Software for handling database management functions and for supporting the display and editing of a table of data may be implemented using equipment 14 and/or equipment 18 (as an example).

Subsets of equipment 12 may also be used to handle user input processing (e.g., touch data processing) and table manipulation functions. For example, equipment 18 and communications link 20B need not be used. When equipment 18 and path 20B are not used, table storage and editing functions may be handled using equipment 14. User input processing may be handled exclusively by equipment 14 (e.g., using an integrated touch pad or touch screen in equipment 14) or may be handled using accessory 16 (e.g., using a touch sensitive accessory to gather touch data from a touch sensor array). If desired, additional computing equipment (e.g., storage for a database or a supplemental processor) may communicate with computing equipment 12 of FIG. 1 using communications links 20 (e.g., wired or wireless links).

Computing equipment 12 may include storage and processing circuitry. The storage of computing equipment 12 may be used to store software code such as instructions for software that handles tasks associated with monitoring and interpreting touch data and other user input. The storage of computing equipment 12 may also be used to store software code such as instructions for software that handles database management functions (e.g., opening and closing files, maintaining information on the data within various files, etc). Content such as table data and data structures that maintain information on the locations of data within tables (e.g., row and column position information) may also be maintained in storage. The processing capabilities of system 10 may be used to gather and process user input such as touch gestures. These processing capabilities may also be used in determining how to display information for a user on a display, how to print information on a printer in system 10, etc. Data manipulation functions such as functions related to adding, deleting, moving, and otherwise editing rows and columns of data in a table may also be supported by the processing circuitry of equipment 12.

Figure 2:
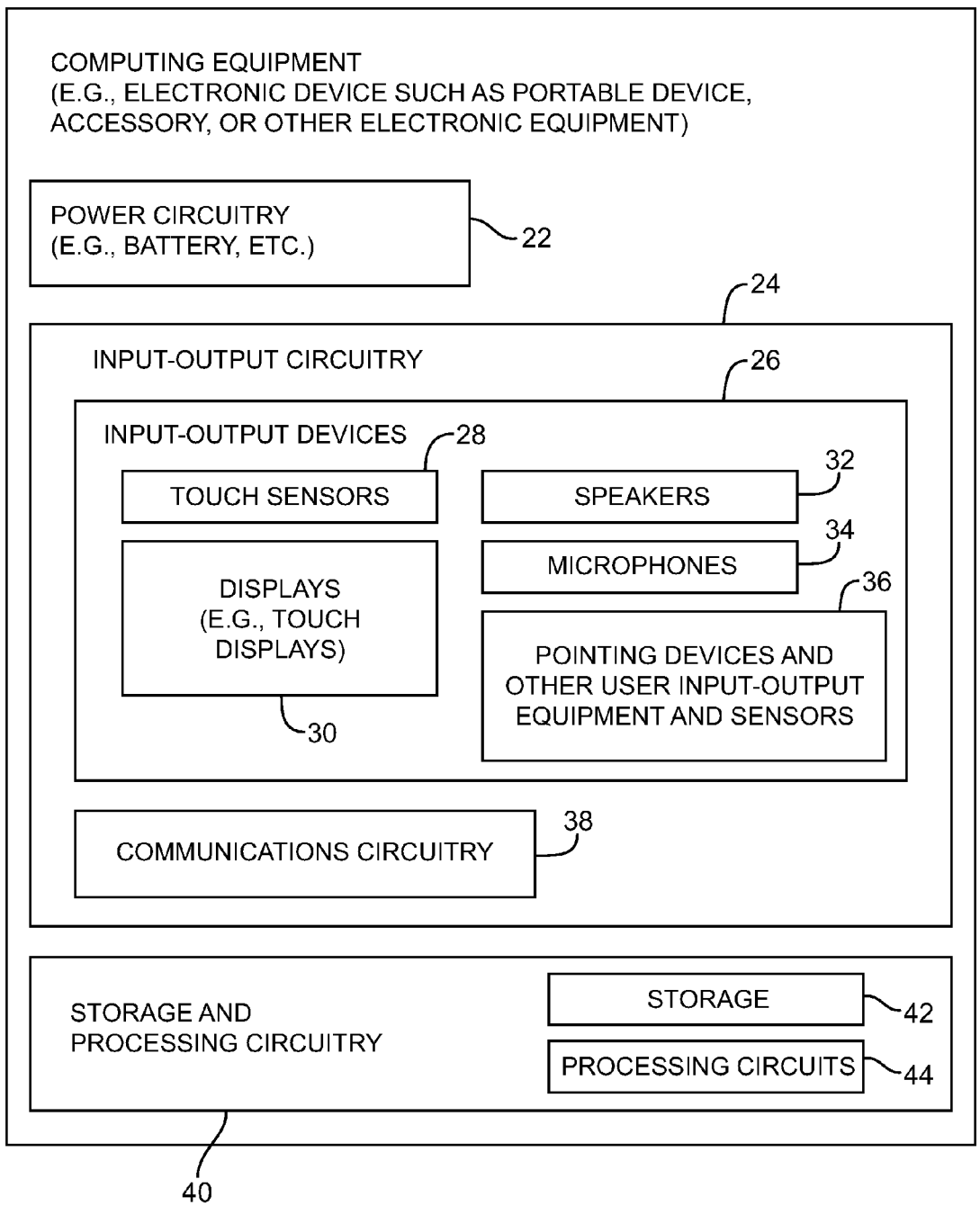
FIG. 2 is a schematic diagram of illustrative computing equipment that may be used in a system of the type shown in FIG. 1 in accordance with an embodiment of the present invention.

Illustrative computing equipment of the type that may be used for some or all of equipment 14, 16, and 18 of FIG. 1 is shown in FIG. 2. As shown in FIG. 2, computing equipment 12 may include power circuitry 22. Power circuitry 22 may include a battery (e.g., for battery powered devices such a cellular telephones, tablet computers, laptop computers, and other portable devices). Power circuitry 22 may also include power management circuitry that regulates the distribution of power from the battery or other power source. The power management circuit may be used to implement functions such as sleep-wake functions, voltage regulation functions, etc.

Input-output circuitry 24 may be used by equipment 12 to transmit and receive data. For example, in configurations in which the components of FIG. 2 are being used to implement equipment 14 of FIG. 1, input-output circuitry 24 may receive data from equipment 16 over path 20A and may supply data from input-output circuitry 24 to equipment 18 over path 20B.

Input-output circuitry 24 may include input-output devices 26. Devices 26 may include, for example, a display such as display 30. Display 30 may be a touch screen (touch sensor display) that incorporates an array of touch sensors. Display 30 may include image pixels formed from light-emitting diodes (LEDs), organic LEDs (OLEDs), plasma cells, electronic ink elements, liquid crystal display (LCD) components, or other suitable image pixel structures. A cover layer such as a layer of cover glass member may cover the surface of display 30. Display 30 may be mounted in the same housing as other device components or may be mounted in an external housing.

If desired, input-output circuitry 24 may include touch sensors 28. Touch sensors 28 may be included in a display (i.e., touch sensors 28 may serve as a part of touch sensitive display 30 of FIG. 2) or may be provided using a separate touch sensitive structure such as a touch pad (e.g., a planar touch pad or a touch pad surface that is integrated on a planar or curved portion of a mouse or other electronic device).

Touch sensor 28 and the touch sensor in display 30 may be implemented using arrays of touch sensors (i.e., a two-dimensional array of individual touch sensor elements combined to provide a two-dimensional touch event sensing capability). Touch sensor circuitry in input-output circuitry 24 (e.g., touch sensor arrays in touch sensors 28 and/or touch screen displays 30) may be implemented using capacitive touch sensors or touch sensors formed using other touch technologies (e.g., resistive touch sensors, acoustic touch sensors, optical touch sensors, piezoelectric touch sensors or other force sensors, or other types of touch sensors). Touch sensors that are based on capacitive touch sensors are sometimes described herein as an example. This is, however, merely illustrative. Equipment 12 may include any suitable touch sensors.

Input-output devices 26 may use touch sensors to gather touch data from a user. A user may supply touch data to equipment 12 by placing a finger or other suitable object (i.e., a stylus) in the vicinity of the touch sensors. With some touch technologies, actual contact or pressure on the outermost surface of the touch sensor device is required. In capacitive touch sensor arrangements, actual physical pressure on the touch sensor surface need not always be provided, because capacitance changes can be detected at a distance (e.g., through air). Regardless of whether or not physical contact is made between the user's finger or other eternal object and the outer surface of the touch screen, touch pad, or other touch sensitive component, user input that is detected using a touch sensor array is generally referred to as touch input, touch data, touch sensor contact data, etc.

Input-output devices 26 may include components such as speakers 32, microphones 34, switches, pointing devices, sensors, cameras, and other input-output equipment 36. Speakers 32 may produce audible output for a user. Microphones 34 may be used to receive voice commands from a user. Cameras in equipment 36 can gather visual input (e.g., for facial recognition, hand gestures, etc.). Equipment 36 may also include mice, trackballs, keyboards, keypads, buttons, and other pointing devices and data entry devices. Equipment 36 may include output devices such as status indicator light-emitting diodes, buzzers, etc. Sensors in equipment 36 may include proximity sensors, ambient light sensors, thermal sensors, accelerometers, gyroscopes, magnetic sensors, infrared sensors, etc. If desired, input-output devices 26 may include other user interface devices, data port devices, audio jacks and other audio port components, digital data port devices, etc.

Communications circuitry 38 may include wired and wireless communications circuitry that is used to support communications over communications paths such as communications paths 20 of FIG. 1. Communications circuitry 38 may include wireless communications circuitry that forms remote and local wireless links. Communications circuitry 38 may handle any suitable wireless communications bands of interest. For example, communications circuitry 38 may handle wireless local area network bands such as the IEEE 802.11 bands at 2.4 GHz and 5 GHz, the Bluetooth band at 2.4 GHz, cellular telephone bands, 60 GHz signals, radio and television signals, satellite positioning system signals such as Global Positioning System (GPS) signals, etc.

Computing equipment 12 may include storage and processing circuitry 40. Storage and processing circuitry 40 may include storage 42. Storage 42 may include hard disk drive storage, nonvolatile memory (e.g., flash memory or other electrically-programmable-read-only memory configured to form a solid state drive), volatile memory (e.g., static or dynamic random-access-memory), etc. Processing circuitry 44 in storage and processing circuitry 40 may be used to control the operation of equipment 12. This processing circuitry may be based on one or more microprocessors, microcontrollers, digital signal processors, application specific integrated circuits, etc.

The resources associated with the components of computing equipment 12 in FIG. 2 need not be mutually exclusive. For example, storage and processing circuitry 40 may include circuitry from the other components of equipment 12. Some of the processing circuitry in storage and processing circuitry 40 may, for example, reside in touch sensor processors associated with touch sensors 28 (including portions of touch sensors that are associated with touch sensor displays such as touch displays 30). As another example, storage may be implemented both as stand-alone memory chips and as registers and other parts of processors and application specific integrated circuits. There may be, for example, memory and processing circuitry 40 that is associated with communications circuitry 38.

Storage and processing circuitry 40 may be used to run software on equipment 12 such as touch sensor processing code, productivity applications such as spreadsheet applications, word processing applications, presentation applications, and database applications, software for internet browsing applications, voice-over-internet-protocol (VOIP) telephone call applications, email applications, media playback applications, operating system functions, etc. Storage and processing circuitry 40 may also be used to run applications such as video editing applications, music creation applications (i.e., music production software that allows users to capture audio tracks, record tracks of virtual instruments, etc.), photographic image editing software, graphics animation software, etc. To support interactions with external equipment (e.g., using communications paths 20), storage and processing circuitry 40 may be used in implementing communications protocols. Communications protocols that may be implemented using storage and processing circuitry 40 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

A user of computing equipment 14 may interact with computing equipment 14 using any suitable user input interface. For example, a user may supply user input commands using a pointing device such as a mouse or trackball and may receive output through a display, speakers, and printer (as an example). A user may also supply input using touch commands. Touch-based commands, which are sometimes referred to herein as gestures, may be made using a touch sensor array (see, e.g., touch sensors 28 and touch screens 30 in the example of FIG. 2). Touch gestures may be used as the exclusive mode of user input for equipment 12 (e.g., in a device whose only user input interface is a touch screen) or may be used in conjunction with supplemental user input devices (e.g., in a device that contains buttons or a keyboard in addition to a touch sensor array).

Touch commands (gestures) may be gathered using a single touch element (e.g., a touch sensitive button), a one-dimensional touch sensor array (e.g., a row of adjacent touch sensitive buttons), or a two-dimensional array of touch sensitive elements (e.g., a two-dimensional array of capacitive touch sensor electrodes or other touch sensor pads). Two-dimensional touch sensor arrays allow for gestures such as swipes and flicks that have particular directions in two dimensions (e.g., right, left, up, down). Touch sensors may, if desired, be provided with multitouch capabilities, so that more than one simultaneous contact with the touch sensor can be detected and processed. With multitouch capable touch sensors, additional gestures may be recognized such as multifinger swipes, pinch commands, etc.

Touch sensors such as two-dimensional sensors are sometimes described herein as an example. This is, however, merely illustrative. Computing equipment 12 may use other types of touch technology to receive user input if desired.

Figure 3:
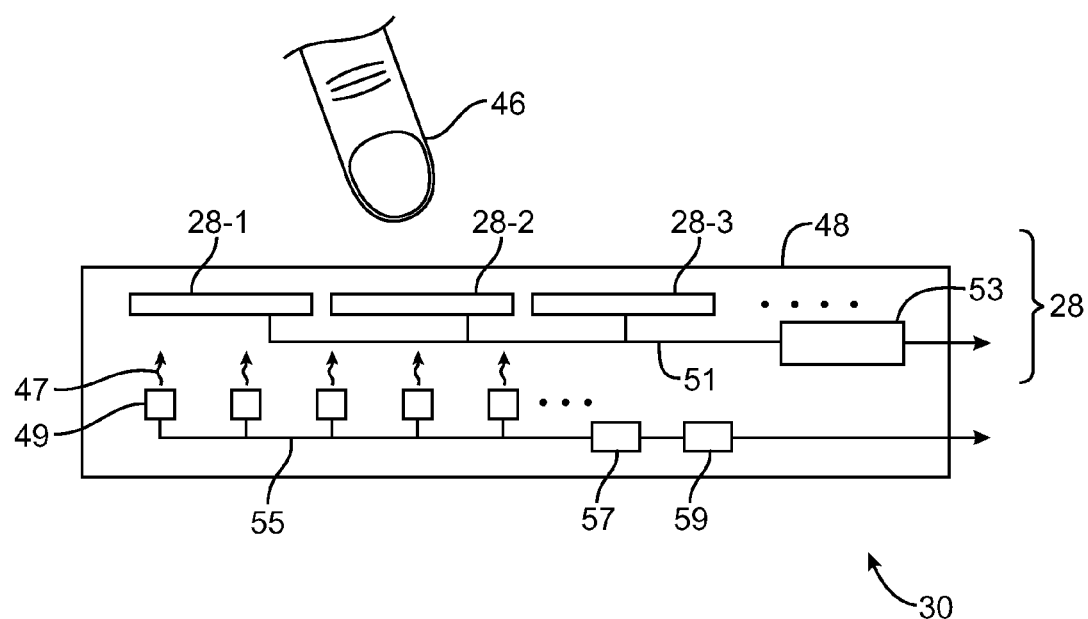
FIG. 3 is a cross-sectional side view of equipment that includes a touch sensor and display structures in accordance with an embodiment of the present invention.

A cross-sectional side view of a touch sensor that is receiving user input is shown in FIG. 3. As shown in the example of FIG. 3, touch sensor 28 may have an array of touch sensor elements such as elements 28-1, 28-2, and 28-3 (e.g., a two-dimensional array of elements in rows and columns across the surface of a touch pad or touch screen). A user may place an external object such as finger 46 in close proximity of surface 48 of sensor 28 (e.g., within a couple of millimeters or less, within a millimeter or less, in direct contact with surface 48, etc.). When touching sensor 28 in this way, the sensor elements that are nearest to object 46 can detect the presence of object 46. For example, if sensor elements 28-1, 28-2, 28-3, ... are capacitive sensor electrodes, a change in capacitance can be measured on the electrode or electrodes in the immediate vicinity of the location on surface 48 that has been touched by external object 46. In some situations, the pitch of the sensor elements (e.g., the capacitor electrodes) is sufficiently fine that more than one electrode registers a touch signal. When multiple signals are received, touch sensor processing circuitry (e.g., processing circuitry in storage and processing circuitry 40 of FIG. 2) can perform interpolation operations in two dimensions to determine a single point of contact between the external object and the sensor.

Touch sensor electrodes (e.g., electrodes for implementing elements 28-1, 28-2, 28-3 ...) may be formed from transparent conductors such as conductors made of indium tin oxide or other transparent conductive materials. Touch sensor circuitry 53 (e.g., part of storage and processing circuitry 40 of FIG. 2) may be coupled to sensor electrodes using paths 51 and may be used in processing touch signals from the touch sensor elements. An array (e.g., a two-dimensional array) of image display pixels such as pixels 49 may be used to emit images for a user (see, e.g., individual light rays 47 in FIG. 3). Display memory 59 may be provided with image data from an application, operating system, or other code on computing equipment 12. Display drivers 57 (e.g., one or more image pixel display integrated circuits) may display the image data stored in memory 59 by driving image pixel array 49 over paths 55. Display driver circuitry 57 and display storage 59 may be considered to form part of a display (e.g., display 30) and/or part of storage and processing circuitry 40 (FIG. 2). A touch screen display (e.g., display 30 of FIG. 3) may use touch sensor array 28 to gather user touch input and may use display structures such as image pixels 49, display driver circuitry 57, and display storage 59 to display output for a user.

Figure 4:
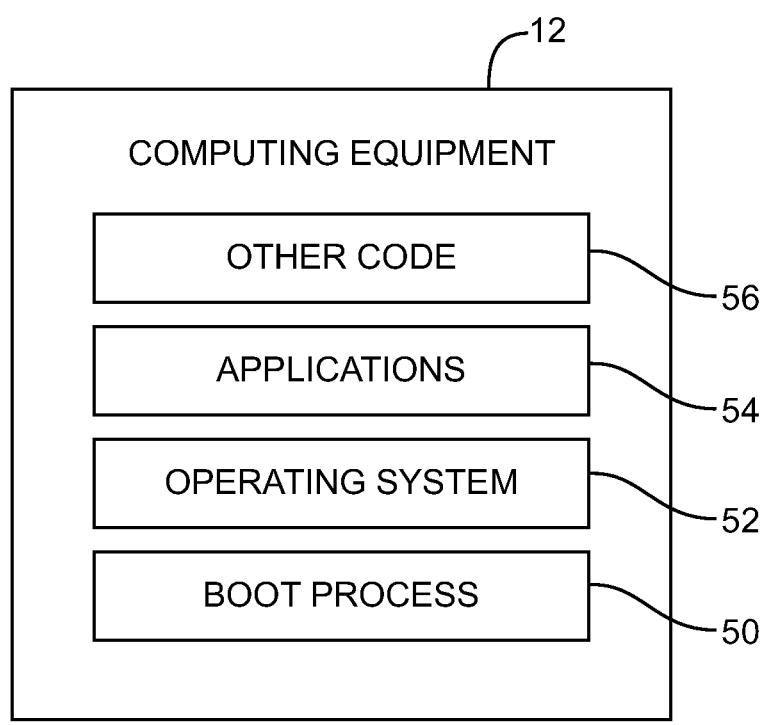
FIG. 4 is a schematic diagram showing code that may be stored and executed on computing equipment such as the computing equipment of FIG. 1 in accordance with an embodiment of the present invention.

FIG. 4 is a diagram of computing equipment 12 of FIG. 1 showing code that may be implemented on computing equipment 12. The code on computing equipment 12 may include firmware, application software, operating system instructions, code that is localized on a single piece of equipment, code that operates over a distributed group of computers or is otherwise executed on different collections of storage and processing circuits, etc. In a typical arrangement of the type shown in FIG. 4, some of the code on computing equipment 12 includes boot process code 50. Boot code 50 may be used during boot operations (e.g., when equipment 12 is booting up from a powered-down state). Operating system code 52 may be used to perform functions such as creating an interface between computing equipment 12 and peripherals, supporting interactions between components within computing equipment 12, monitoring computer performance, executing maintenance operations, providing libraries of drivers and other collections of functions that may be used by operating system components and application software during operation of computing equipment 12, supporting file browser functions, running diagnostic and security components, etc.

Applications 54 may include productivity applications such as word processing applications, email applications, presentation applications, spreadsheet applications, and database applications. Applications 54 may also include communications applications, media creation applications, media playback applications, games, web browsing application, etc. Some of these applications may run as stand-alone programs, others may be provided as part of a suite of interconnected programs. Applications 54 may also be implemented using a client-server architecture or other distributed computing architecture (e.g., a parallel processing architecture).

Computing equipment 12 may also have other code 56 (e.g., add-on processes that are called by applications 54 or operating system 52, plug-ins for a web browser or other application, etc.).

Code such as code 50, 52, 54, and 56 may be used to handle user input commands (e.g., gestures and non-gesture input) and can perform corresponding actions. For example, the code of FIG. 4 may be configured to receive touch input. In response to the touch input, the code of FIG. 4 may be configured to perform processing functions and output functions. Processing functions may include evaluating mathematical functions, moving data items within a group of items, adding and deleting data items, updating databases, presenting data items to a user on a display, printer, or other output device, sending emails or other messages containing output from a process, etc.

Raw touch input (e.g., signals such as capacitance change signals measured using a capacitive touch sensor or other such touch sensor array data) may be processed using storage and processing circuitry 40 (e.g., using a touch sensor chip that is associated with a touch pad or touch screen, using a combination of dedicated touch processing chips and general purpose processors, using local and remote processors, or using other storage and processing circuitry).

Gestures such as taps, swipes, flicks, multitouch commands, and other touch input may be recognized and converted into gesture data by processing raw touch data. As an example, a set of individual touch contact points that are detected within a given radius on a touch screen and that occur within a given time period may be recognized as a tap gesture or as a tap or hold portion of a more complex gesture. Gesture data may be represented using different (e.g., more efficient) data structures than raw touch data. For example, ten points of localized raw contact data may be converted into a single tap or hold gesture. Code 50, 52, 54, and 56 of FIG. 4 may use raw touch data, processed touch data, recognized gestures, other user input, or combinations of these types of input as input commands during operation of computing equipment 12.

Figure 5:
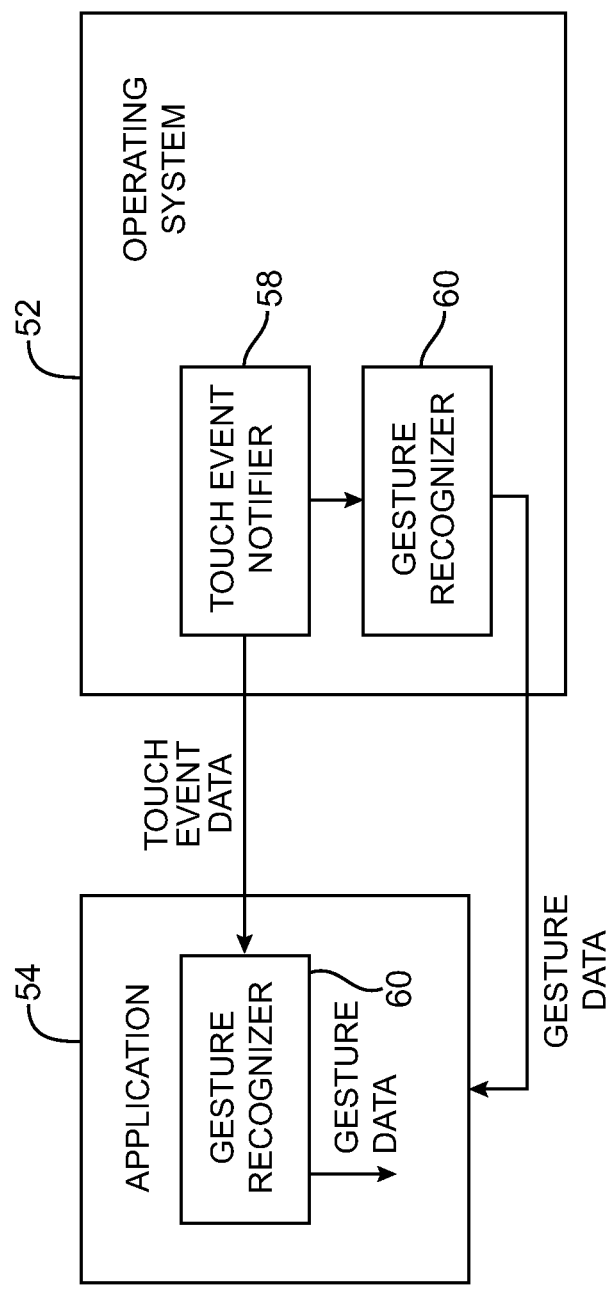
FIG. 5 is a schematic diagram showing how touch gesture data may be extracted from touch event data using touch recognition engines in accordance with an embodiment of the present invention.

If desired, touch data (e.g., raw touch data) may be gathered using a software component such as touch event notifier 58 of FIG. 5. Touch event notifier 58 may be implemented as part of operating system 52 or as other code executed on computing equipment 12. Touch event notifier 58 may provide touch event data (e.g., information on contact locations with respect to orthogonal X and Y dimensions and optional contact time information) to gesture recognition code such as one or more gesture recognizers 60. Operating system 52 may include a gesture recognizer that processes touch event data from touch event notifier 58 and that provides corresponding gesture data as an output. An application such as application 54 or other software on computing equipment 12 may also include a gesture recognizer. As shown in FIG. 5, for example, application 54 may perform gesture recognition using gesture recognizer 60 to produce corresponding gesture data.

Figure 6:
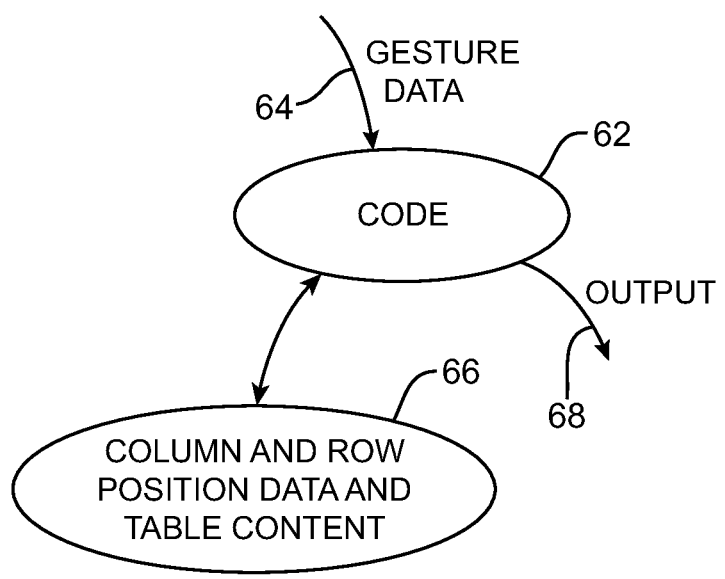
FIG. 6 is a diagram showing how gesture data may be received and processed by code that is running on computing equipment of the type shown in FIG. 1 and showing how the code may perform associated actions such as updating output and updating column and row data within a table or other array of data items a database in accordance with an embodiment of the present invention.

Gesture data that is generated by gesture recognizer 60 in application 54 or gesture recognizer 60 in operating system 52 or gesture data that is produced using other gesture recognition resources in computing equipment 12 may be used in controlling the operation of application 54, operating system 52, and other code (see, e.g., the code of FIG. 4). For example, gesture recognizer code 60 may be used in detecting tap or hold gesture activity from a user to select rows or columns in a table and may be used in detecting flick gestures to move the rows or columns within the table. The use of gesture data from gesture recognizer code 60 of FIG. 5 is shown in FIG. 6. As shown in FIG. 6, code 62 (e.g., code 50, code 52, code 54, and/or code 56 of FIG. 4) may receive gesture data 64. Code 62 may take suitable action in response to various gestures represented by the gesture data. For example, as shown in FIG. 6, code 62 may take actions related to manipulating stored content 66 and in manipulating output 68. Code 62 may, for example, insert or delete rows or columns or reposition rows or columns of data 66 within a table or other data structure that is stored in storage 42. These table manipulation operations may involve, for example, updating pointers or list entries in data structures that are stored in a database (e.g., data 66 stored in storage 42). The updated data may be part of a local database maintained on the same device that contains the touch sensor or may be a remote database at a server. When the database is maintained remotely, a client program (e.g., an application or other code) may use a local (or associated) touch screen or other touch sensor to obtain gestures and may send corresponding commands to a remote server over a communications network that direct the remote server to update a database at the remote server to account for the new row and column positions in the table. Pointers or other data structures may be used to maintain state information that represents the current state of a table or other data structure, and may support table data operations in local or remote storage 42 such as operations to insert, delete, save, move, and otherwise edit rows and columns of data and other data 66.

In addition to performing operations on data in a database (e.g., in addition to manipulating data structures that include row and column position information, table cell entries, and other content 66 stored in storage 42 of FIG. 2), code 62 may control the presentation of output to a user of computing equipment 12, as indicated by output 68 of FIG. 6. For example, code 62 may be configured to print output for a user on a printer in computing equipment 12. Code 62 may also be configured to display output for a user on a display in computing equipment 12 (e.g., by continuously updating display memory in storage and processing circuitry 40, the display driver integrated circuits in display 30, and associated pixel array portions of display 30). If desired, code 62 may be configured to transmit a message containing output for a user using communications circuitry in computing equipment 12, may convey output to a remote display or computer, or may otherwise produce output 68.

In a typical scenario, a user may interact with data that is displayed on a display screen in real time. Using touch gestures (gesture data 64), code 62 may be informed of a user's commands for manipulating the content. The manipulated content (e.g., content 66) may be modified in response to the user's commands by code 62. Code 62 may also display modified output 68 on a display. If, for example, a user supplies computing equipment 12 with instructions to insert a row or column into a table adjacent to a selected row or column of the table, code 62 may select the desired row or column, may highlight the selected row or column to provide visual feedback to the user, and may animate movement of the affected rows or columns in the table to create room for the newly inserted row or column or otherwise present a visual representation of insertion of a row or column to the user. Once movement is complete, the inserted row or column may be presented in an appropriate table location and data structures 66 can be updated accordingly. Similarly, if a user supplies computing equipment 12 with instructions to delete a particular row or column, code 62 may display visual feedback to the user during the deletion process and, once row or column deletion is complete, the table may be updated on the display and data structures 66 can be updated accordingly.

In general, computing equipment 12 may be controlled using any suitable gestures or combination of gestures. Examples of gestures include taps, double taps, triple taps, quadruple taps, taps that include more than four taps in succession and/or multiple touch locations, single-touch (single-finger) swipes, double-touch (double-finger) swipes, triple-touch (triple-finger) swipes, swipes involving more than three touch points, press and hold gestures, inwards (contracting) pinches, outwards (expanding) pinches, flicks, holds (i.e., prolonged touches at fixed locations), hold and flicks, etc. Some of these gestures may require fewer movements on the part of a user and may use less battery power within battery-powered computing equipment 12. For example, use of a hold and flick gesture (i.e., a gesture in which one finger or other object is held at a fixed location while another finger or object is flicked) may be used to rapidly perform row and column insertion and deletion operations. This may reduce the amount of time computing equipment 12 takes to process a row or column insertion or deletion, thereby reducing power consumption requirements and burden on the user.

Figure 7:
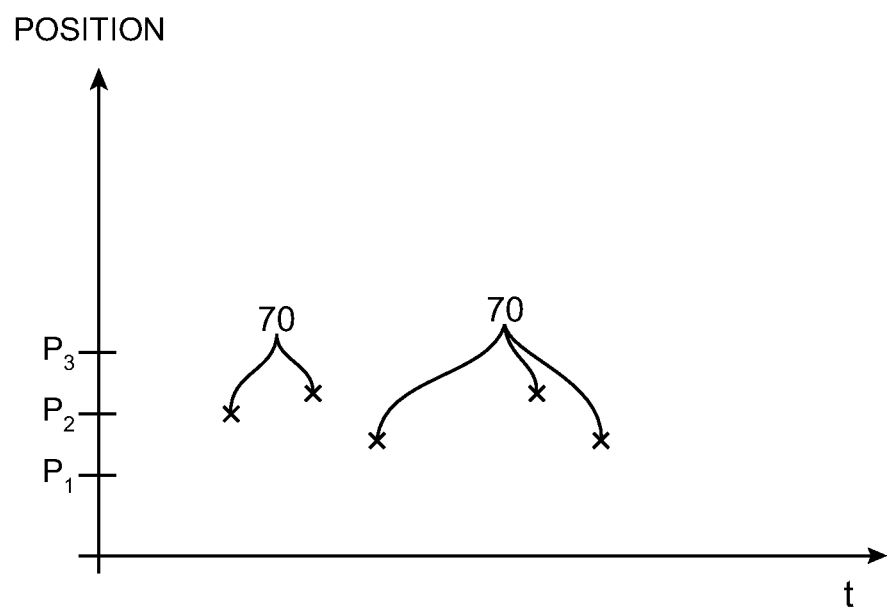
FIG. 7 is a graph showing touch data that may be associated with a tap in accordance with an embodiment of the present invention.

FIG. 7 is a graph showing measured position (plotted in one dimension for clarity in the FIG. 7 example) versus time as a user's finger or other external object is in contact with a touch sensor. As shown in FIG. 7, touch sensor arrays typically gather touch data in the form of a series of discrete touch data points 70, each of which corresponds to a unique position of the user's finger or other external object on the touch sensor. In situations in which the external object is moving, a different respective time will be associated with each touch data point.

In the example of FIG. 7, the user is not moving the external object significantly, so touch points do not vary significantly from location P2 as a function of time (i.e., the position of the user's touch is bounded between minimum position P1 and maximum position P3). Provided that positions P1 and P3 are sufficiently close to position P2, gesture recognizer 60 will interpret touch event of the type shown in FIG. 7 as a tap. A tap gesture may be used, for example, to select an item of interest on a display. A tap gesture that is performed at the same time as another gesture such as a flick is sometimes referred to as a hold gesture. Hold gestures may also be characterized by extended times with relatively little movement. For example, a rapid tap gesture may be performed in tenths of a second or less, whereas a hold gesture may involve holding a finger or other object at substantially the same position on the touch sensor for 0.4 seconds or more 0.6 seconds or more, 0.8 seconds or more, or 1.0 seconds or longer (as examples).

Figure 8:
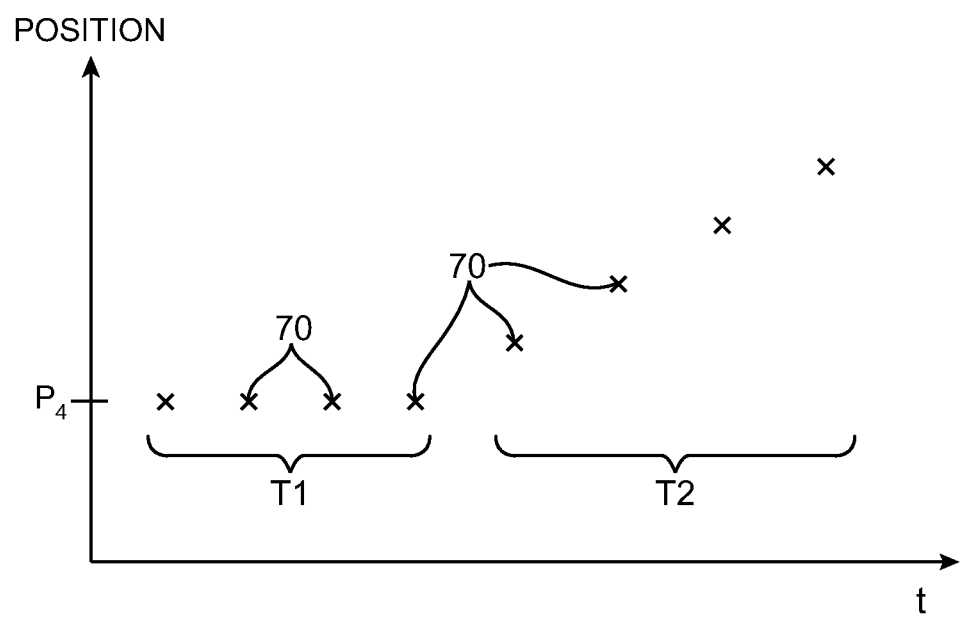
FIG. 8 is a graph showing illustrative touch event data that may be associated with a select and drag gesture in accordance with an embodiment of the present invention.

The type of touch data that may be generated during a typical swipe gesture is shown in FIG. 8. Initially (e.g., during time period T1) a user may place an external object at position P4. During time period T2, the user may move the external object across the display (e.g., at a slow to moderate speed). Time periods T1 and T2 are contiguous, because there is no intervening gap in touch contact between periods T1 and T2 (i.e., the initial touching activity and the swiping motions of FIG. 8 may be considered to form part of a unitary swipe operation). After time period T2, touch events 70 cease, because the user in this example has removed the external object from the touch sensor.

In a flick gesture, there is typically no initial stationary touch event associated with the moving object (i.e., there is no stationary contact at position P4 in period T1) and the user may move the external object across the touch sensor more rapidly (and for less total time) than in a swipe gesture. Flick gestures may be made in conjunction with other gestures to create more complex gestures. For example, a tap gesture may be used to select and item and a subsequent flick gesture may be used to perform an action on that item. As another example, a hold gesture may be combined with a simultaneous flick gesture at a different part of the touch sensor to create a hold and flick gesture. Different types of actions may be taken, depending on the location of the hold, the direction of the flick (left for a left flick, right for a right flick, upwards for an up flick, or downwards for a down flick), and the relative position of the flick with respect to the hold (i.e., with the flick left, right, above, or below the hold location).

Figure 9:
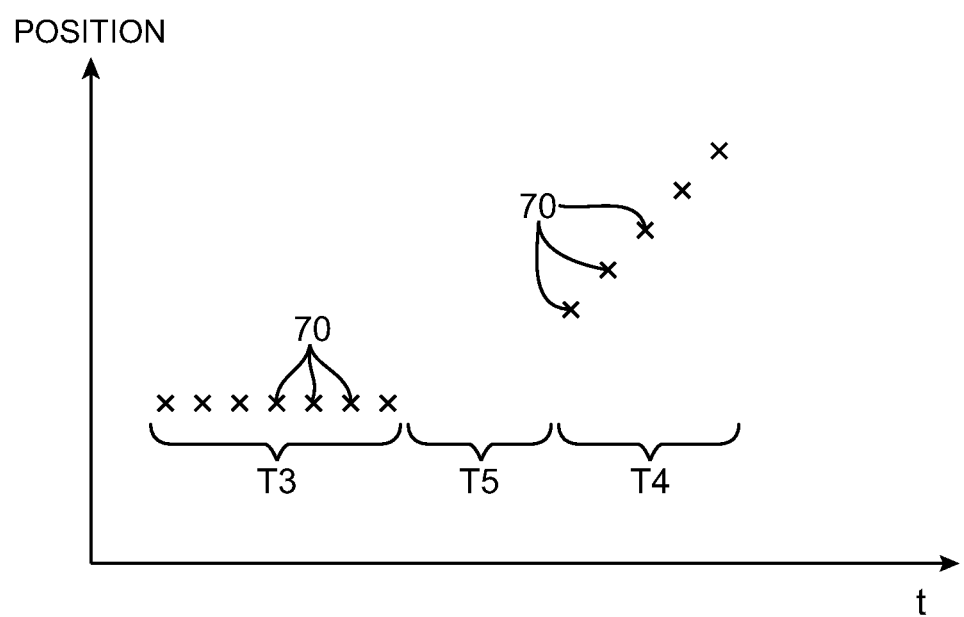
FIG. 9 is a graph showing illustrative touch data that may be associated with a tap and flick gesture in accordance with an embodiment of the present invention.

The graph of FIG. 9 shows the type of data that may be associated with a tap and flick gesture. Tap data may be produced during time period T3 and flick data may be produced during time period T4. As shown in FIG. 9, an illustrative tap gesture may be associated with a series of measured touch data points 70 (i.e., a series of contacts 70 that are detected within a fairly localized portion of the touch sensor). A flick gesture (or the flick gesture portion of a tap and flick gesture) may be associated with a series of measured touch data points 70 that correspond to fairly rapid and possibly accelerating movement of a finger or other object across the touch sensor array (i.e., unidirectional movement that typically does not last longer than a fraction of a second or perhaps only tenths of a second or less). A velocity threshold (and, if desired, an acceleration threshold and/or a total gesture time threshold) may be used to help discriminate swipes from flicks. Tap and flick gestures of the type shown in FIG. 9 can also be differentiated from swipes of the type shown in FIG. 8 based at least partly on the presence of a gap between tap period T3 and flick period T4 (i.e., period T5, which is devoid of touch events, indicating that the user has removed the external object from the touch sensor during period T5).

Figure 10:
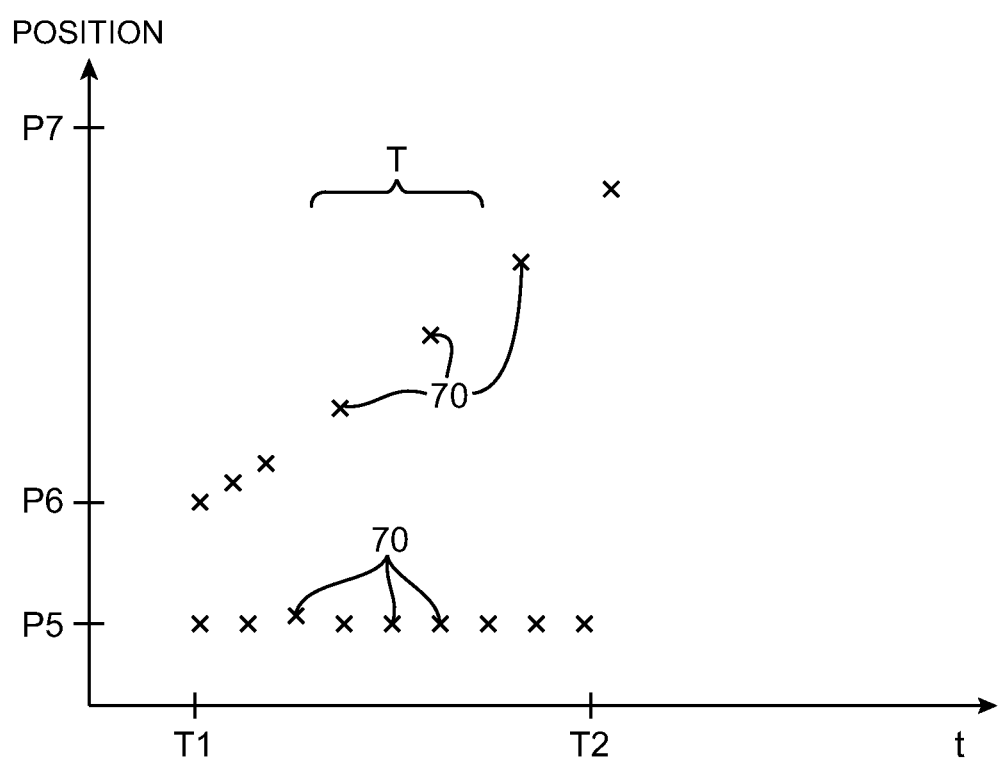
FIG. 10 is a graph showing illustrative touch data of the type that may be associated with a hold and flick gesture in accordance with an embodiment of the present invention.

The graph of FIG. 10 shows the type of data that may be associated with a hold and flick gesture. In the FIG. 10 example, some of touch data points 70 are associated with a touch at a relatively fixed location on the touch sensor (position P5), whereas other touch data points 70 are associated with a moving touch event (i.e., a gesture in which a finger or other object is flicked from an initial position at P6 to a final position of P7). The touch data for the fixed location may correspond to a hold gesture (sometimes also referred to as a press and hold gesture, touch and hold gesture, a stationary touch gesture, etc.). The touch data for the relatively rapid movement from position P6 to P7 may correspond to a flick event that is made at another sensor location (i.e., adjacent to the hold location).

In the example of FIG. 10, both the hold gesture and the flick gesture start at about time T1 and end at about T2. These gestures are therefore substantially equal in duration and fully overlap (i.e., the gestures are performed simultaneously). In other situations, there may be less overlap between the hold portion of a given hold and flick gesture and the simultaneous flick portion of the hold and flick gesture (e.g., because the flick gesture covers only a time period T that starts after the hold gesture and ends while before the end of the hold gesture). In scenarios in which there is full overlap in duration between the hold and flick gesture portions of a hold and flick gesture and in scenarios in which there is a partial overlap in time between the hold and flick gesture portions, the hold gesture and the flick gesture are often referred to collectively as forming a hold and flick gesture (i.e., a gesture that includes a hold portion and a simultaneous flick portion).

Gestures such as hold and flick gestures may be used to select table content and perform operations on the selected table content. For example, the hold portion of a hold and flick gesture may be used to select one or more rows or columns in a table for deletion, whereas the flick portion of the hold and flick gesture can instruct computing equipment 12 to delete the selected rows or columns. A hold and flick gesture may also be used to delete or insert rows or columns based on the location of previously selected content (e.g., one or more previously selected rows or columns) without using the hold portion to select a particular new row or column. A user may, for example, select rows and columns using gestures and/or other forms of input, followed by a hold and flick gesture to perform a desired action on the selected rows or columns.

In situations such as those in which a user desires to change which content has been selected or in which no content has yet been selected, the hold portion of a hold and flick gesture can be used to select a row or column and the flick portion of the hold and flick gesture can be used to instruct computing equipment 12 to perform row or column insertion. Rows or columns may, for example, be inserted before a selected row or column when a flick gesture is made before the selected row or column (i.e., when a flick gesture is made to the left of a hold gesture that has selected a column or when a flick gesture is made above a hold gesture that has selected a row). Similarly, rows or columns may be inserted after a selected row or column when a flick gesture is made after the selected row or column (i.e., when a flick gesture is made to the right of a hold gesture that has selected a column or when the flick gesture is made below a hold gesture that has selected a row).

FIGS. 11A, 11B, 11C, 11D, 11E, and 11F are two-dimensional graphs showing the positions (relative to orthogonal lateral touch sensor array dimensions X and Y) of illustrative sequences of touch sensor contacts 70 that may be associated with various types of gestures. The gestures of FIGS. 10A, 10B, 10C, 10D, 10E, and 10F may be used individually or in any combination. Gesture recognizer code 60 may analyze the raw touch sensor data points (sometimes referred to as touch contacts or touch events) to generate gesture data (i.e., recognized gestures).

Figure 11A:
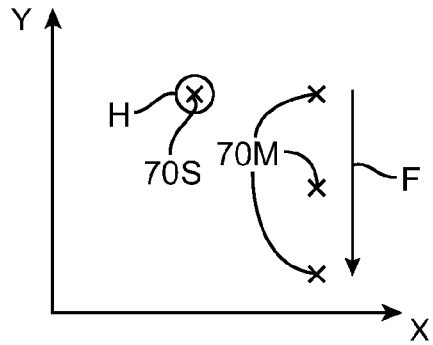
FIG. 11A is a graph showing illustrative touch data of the type that may be associated with a hold and right downflick gesture in accordance with an embodiment of the present invention.

FIG. 11A shows touch data that may be associated with a hold and right downflick gesture. Stationary touch data 70S (e.g., one or more data points within a given localized portion of the sensor) is associated with hold gesture H, whereas moving touch data 70M is associated with a downwards flick (i.e., downflick F). The downflick gesture of the FIG. 11A example is located to the right of hold gesture H. Downflick gestures of this type are sometimes referred to as right downflicks.

Figure 11B:
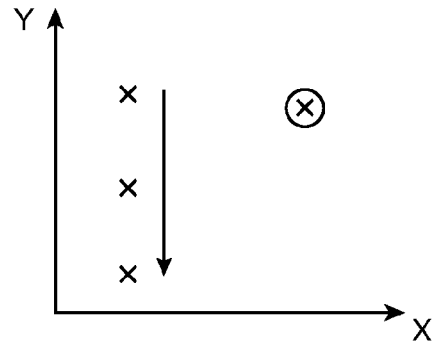
FIG. 11B is a is a graph showing illustrative touch data of the type that may be associated with a hold and left downflick gesture in accordance with an embodiment of the present invention.

FIG. 11B shows data that may be associated with a hold and left downflick gesture. The gesture of FIG. 11B includes hold gesture H associated with stationary touch data 70S and downflick gesture F associated with moving touch data 70M. Downflick F of FIG. 11B may be considered to be a left downflick because downflick F is located to the left of hold H.

Figure 11C:
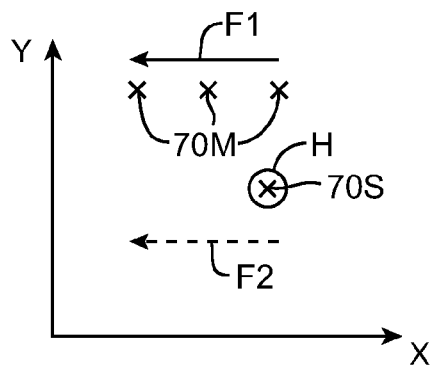
FIG. 11C is a graph showing illustrative touch data of the type that may be associated with a hold and leftflick gesture in which the left flick is made above or below the hold location in accordance with an embodiment of the present invention.

In FIG. 11C, hold H is associated with stationary touch data 70S. Leftflick F1 is associated with a series of touch data points 70M that are generated as the user flicks a finger or other object to the left. Leftflick F1 is located above hold H (i.e., leftflick F1 is an upper leftflick). If desired, a hold and leftflick gesture may be performed by a user that includes a leftflick that is located below hold gesture H (see, e.g., lower leftflick F2).

Figure 11D:
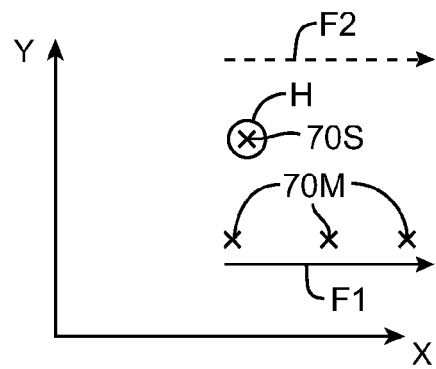
FIG. 11D is a graph showing illustrative touch data of the type that may be associated with a hold and rightflick gesture in which the right flick is made above or below the hold location in accordance with an embodiment of the present invention.

In FIG. 11D, hold H is associated with stationary touch data 70S. Rightflick F1 is associated with a series of touch data points 70M that are generated as the user flicks a finger or other object to the right. Rightflick F1 is located below hold H (i.e., rightflick F1 is a lower rightflick). If desired, a hold and rightflick gesture may involve use of a rightflick that is located above hold gesture H such as upper rightflick F2 of FIG. 11D.

Figure 11E:
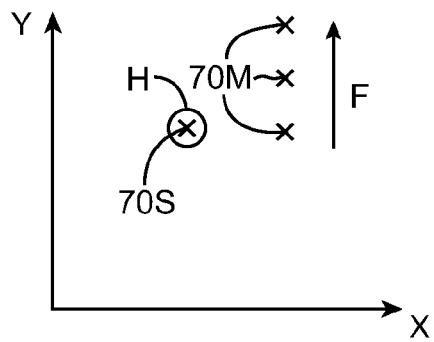
FIG. 11E is a graph showing illustrative touch data of the type that may be associated with a hold and right upflick gesture in accordance with an embodiment of the present invention.

FIG. 11E is an example of a hold and upflick gesture. In the FIG. 11E gesture, hold gesture H is associated with stationary touch data 70S and upwards flick (upflick) gesture F is associated with data points 70M. Flick F of FIG. 11E is located to the right of hold gesture H and is therefore a right upflick gesture.

Figure 11F:
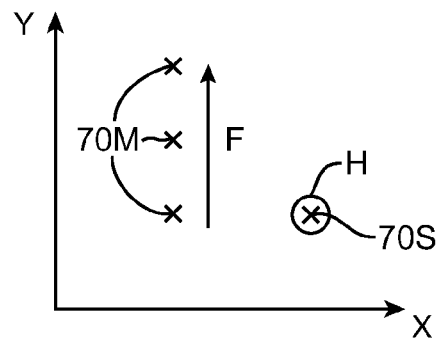
FIG. 11F is a graph showing illustrative touch data of the type that may be associated with a hold and left upflick gesture in accordance with an embodiment of the present invention.

If desired, a hold and left upflick gesture may be used to control equipment 12. In the example of FIG. 11F, hold gesture H is associated with stationary touch data 70S and upflick gesture F is associated with data points 70M. Upflick F of FIG. 11F is located to the left of hold gesture H and is therefore a left upflick gesture.

Touch input such as hold and flick gestures and other gestures may be used in controlling the code of FIG. 4. For example, hold and flick gestures may be used in manipulating columns and rows of data in a table (sometimes also referred to as a list or array of data).

Figure 12:
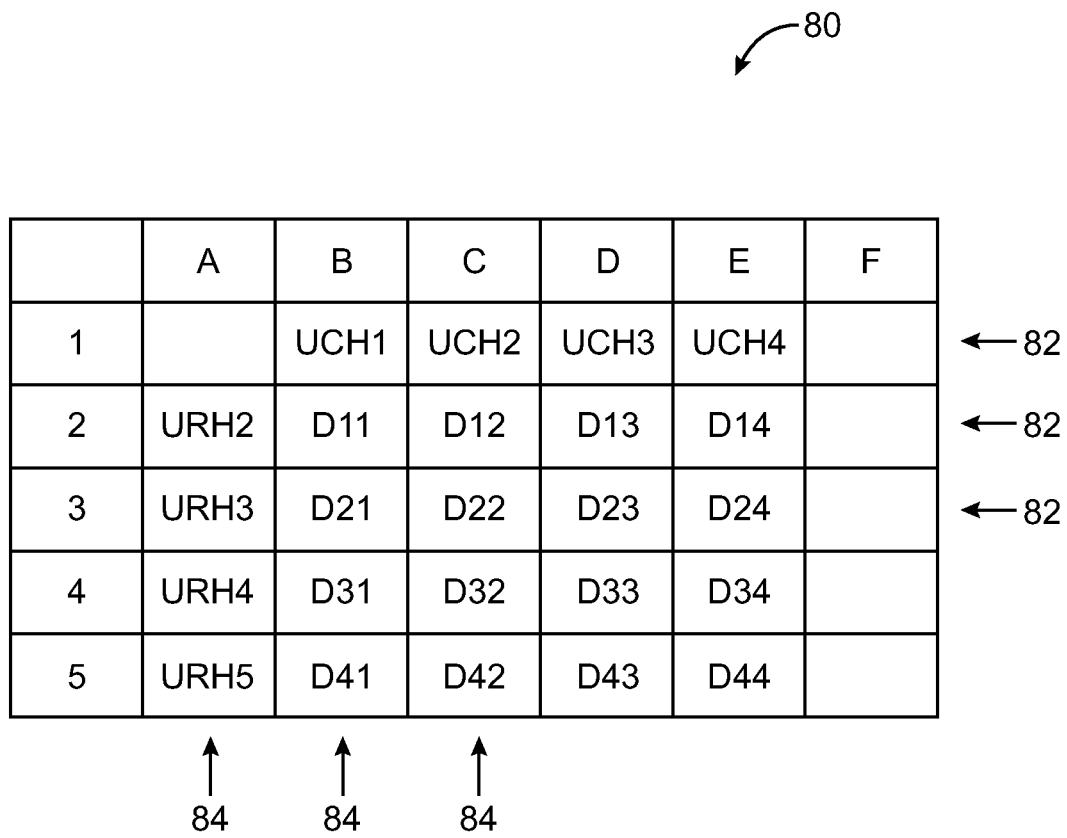
FIG. 12 shows an illustrative table of data that may be presented to a user of computing equipment in accordance with an embodiment of the present invention.

Tables of data elements may be produced by the code of FIG. 4 during operation of computing equipment 12. For example, application code such as a spreadsheet application or word processing application or other such application may display a table of cells. Each cell may contain a string, number, formula, or other information. FIG. 12 shows an illustrative table of the type that may be presented using the code of FIG. 4 running on computing equipment 12. As shown in FIG. 12, table 80 may contain rows 82 and columns 84. Some of the rows and some of the columns may contain empty cells. Other cells (sometimes referred to as the cells making up the body region of table 80) may contain data and may therefore not be empty. Each row 82 may contain a default row header (e.g., a row number such as 1, 2, 3 . . . ) and one or more optional user-defined row headers (e.g., URH2, URH3, . . . ). Each column 84 may contain a default column header (e.g., a column letter such as A, B, C, . . . ) and one or more optional user-defined column headers (e.g., UCH1, UCH2, . . . ).

A user who desires to delete a row or column in table 80 or who desires to insert a row or column before or after a selected row or column may select a row or column of data using the hold portion of a hold and flick gesture (and/or using other user input such as tap gestures, pinch gestures, swipe gestures, pinch gestures, other gestures, combinations of these gestures, non-touch input, combinations of gestures and non-touch input, etc.). The hold gestures may be accompanied by an overlapping (e.g., substantially simultaneous or at least partly overlapping) flick gesture. The orientation of the flick gesture (i.e., whether before or after the hold) and the direction of the flick gesture (i.e., up, down, left, or right) may control the type of table manipulation that is performed (e.g., deletion or insertion) and the position of the inserted row or column (e.g., above or below the selected row or column).

Figure 13:
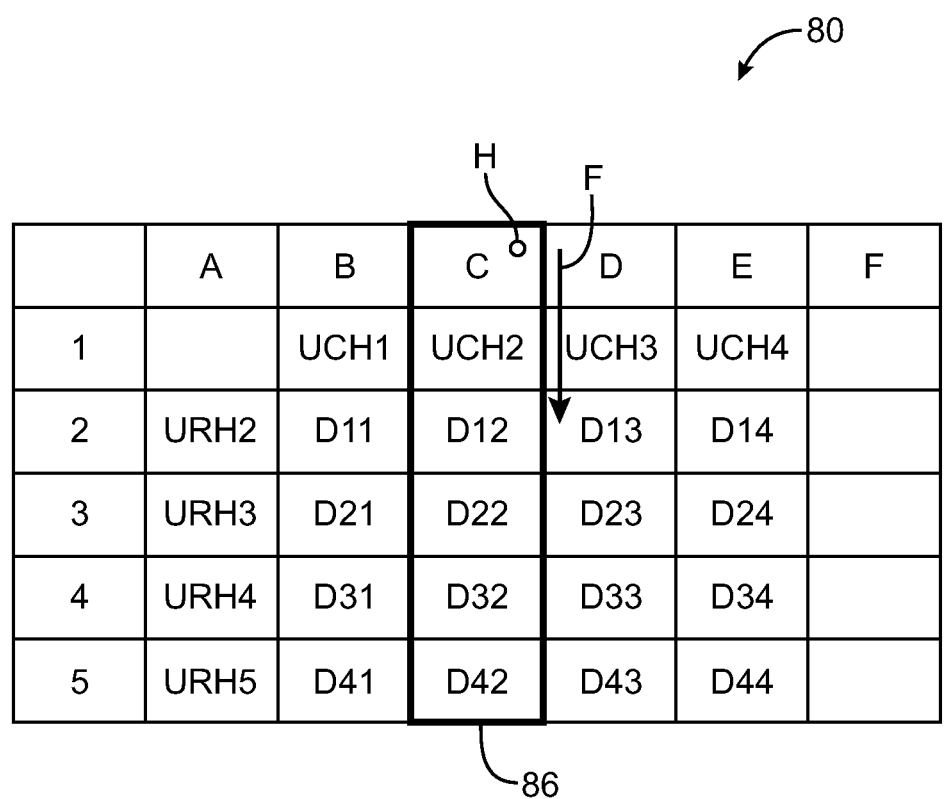
FIG. 13 shows how a column of data may be selected using the hold portion of a hold and right downflick gesture in accordance with an embodiment of the present invention.

Consider, as an example, the scenario depicted in FIG. 13. In the FIG. 13 example, a hold and right downflick gesture is being used to insert a column in table 80 after column C. A user has touched column header C using hold gesture H and has made downflick gesture F at a location of the touch sensor that is to the right of hold H (i.e., at a location that is after hold H). The hold gesture H (e.g., the hold gesture made on the column header or other suitable portion of column C) may direct computing equipment 12 to select column C and highlight column C. Column C may be highlighted using any suitable highlighting scheme that provides the user with visual feedback confirming that column C has been selected. Examples of highlighting schemes that computing equipment 12 can use to indicate that a column, row, or other portion of table 80 has been selected include selectively increasing brightness (for the selected portion), changing color, changing saturation, changing whether the selected portion is static or moving (e.g., adding animated features), encircling the selected portion, adding cross hatching, shading, or other indicators, increasing the size of the selected portion relative to comparable elements in the table, using pointers, etc. In the FIG. 13 example and other examples herein, the presence of optional highlighting on the display of equipment 12 is indicated by highlight region 86. This is, however, merely illustrative. Any suitable highlighting scheme may be used to indicate which items have been selected if desired.

In the scenario of FIG. 13, flick gesture F may be considered to be located after hold gesture H, because flick gesture F is a downflick and is located to the right of hold gesture H. The hold and right downflick gesture of FIG. 13 may be interpreted by equipment 12 as a command to insert a column in table 80 after column C (as an example). Computing equipment 12 may respond to the detected hold and right downflick gesture of FIG. 13 by inserting a column to the right of the selected column. In particular, an empty column of cells may be inserted in column D immediately to the right of column C, as shown in FIG. 14. When a new column is inserted in this way, the old columns in the table may be moved over to the right by one column each to accommodate the new column. For example, the entries that were previously located in columns D and E in the table of FIG. 13 may be moved to columns E and F, respectively, in the table of FIG. 14.

The overall size of the table may or may not change in response to the insertion of rows or columns depending on the configuration of the table editing system implemented on computing equipment 12.

In arrangements in which the overall size of the table is fixed, the number of rows and the number of columns is fixed, so the insertion of a new column or row will cause entries to be moved within the fixed boundaries of the table. For example, if the table in the example of FIGS. 13 and 14 has a fixed six-column width, the column E entries of FIG. 13 may be moved to the column F position of FIG. 14 without adjusting the width of the table.

In arrangements in which the overall size of the table is allowed to expand or contract, insertion of a new column (e.g., a new column between columns C and D as in the FIG. 13 example) will cause the size of the table to expand (i.e., to include column G, shown as dotted lines in the table of FIG. 14). The same behavior applies to row insertions. Addition of a row within a fixed-size table will not affect the number of rows in the table. Addition of a row within a variable-size table will cause a row to be added to the table.

Systems with fixed tables and variable tables also handle the deletion of rows and columns differently. For example, the deletion of a column in a fixed-table-size system will not affect the number of columns in the table. Table content can be slid over within the fixed confines of a fixed-size table to accommodate the deletion of the column. The size of the table can remain fixed in this type of configuration regardless of whether rows or columns are deleted. In a system with variable table sizes, the size of the table can be modified following the deletion of a row or column. For example, if a column is deleted from a table in a variable-size-table system, the size of the table can be shrunk by one column. If a row is deleted from a table in a variable-size-table system, the number of columns in the table may be reduced by one.

The use of a hold and flick gesture to insert a column or row in table 80 may be less burdensome on users than arrangements in which columns are inserted using more cumbersome commands, because a single gesture can be immediately acted on by computing equipment 12. This minimizes user effort and therefore conserves power relative to more involved and drawn out command scenarios. The use of a hold and right downflick gesture to insert a column to the right of a selected column is intuitive, because the column is being inserted on the same side of the selected column as the flick gesture is being made relative to the hold gesture. In other words, a user who desires to insert a column after a given column can select the column with a hold gesture and can indicate that this column is to be inserted after the given column by using a flick gesture that is effectively located after the hold gesture.

Figure 15:
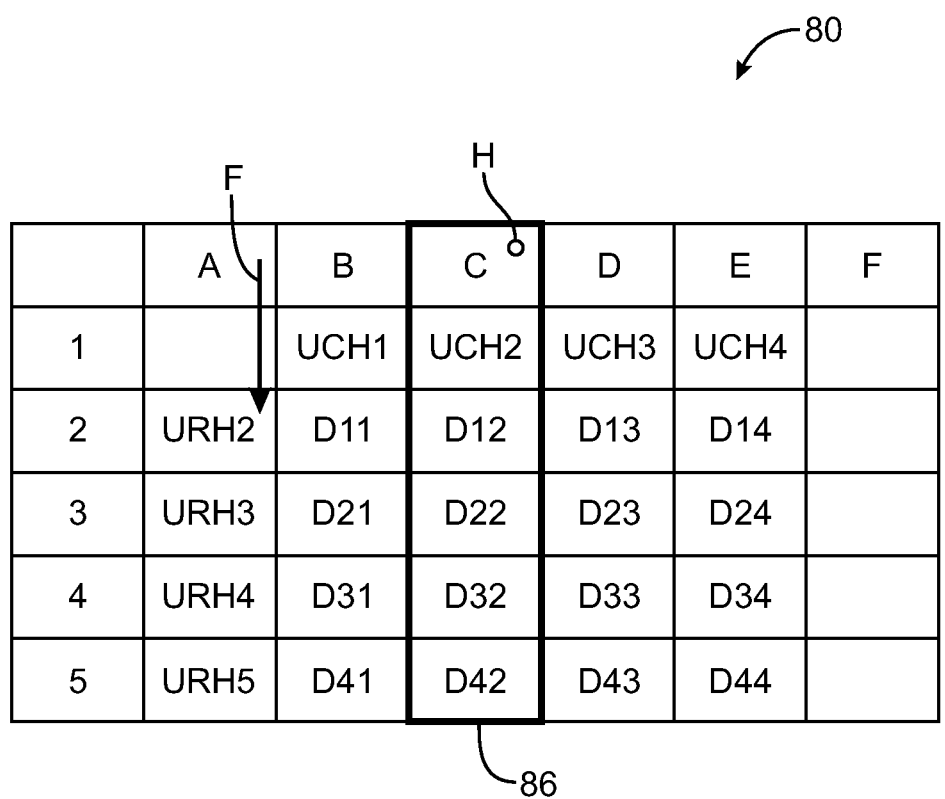
FIG. 15 shows how a column of data may be selected using the hold portion of a hold and left downflick gesture in accordance with an embodiment of the present invention.

FIG. 15 shows how a hold and left downflick gesture may be used to direct computing equipment 14 to select and highlight column C and to insert a column before selected column C. Computing equipment 12 can detect the hold and left downflick gesture of FIG. 15 and can insert a column to the left of column C as shown in FIG. 16. Flick gesture F in the scenario of FIG. 15 may be considered to be located before hold gesture H, because flick gesture F is a downflick and is located to the left of hold gesture H. The hold and left downflick gesture of FIG. 13 may be interpreted by equipment 12 as a command to insert a column in table 80 before column C and equipment 12 can respond by moving the contents of original column C (and all higher numbered columns such as columns D and E) one column to the right in table 80. As shown in FIG. 16, for example, the original entries of columns C, D, and E in FIG. 15 may be shifted to the right by one column so that these entries are located respectively in columns D, E, and F in FIG. 16.

FIG. 17 shows a table into which rows may be inserted using hold and flick gestures. A user may select a desired row by making a hold gesture on a particular row header (e.g., one of the numbers 1, 2, 3, 4, . . . in table 80 of FIG. 17).

Figure 18:
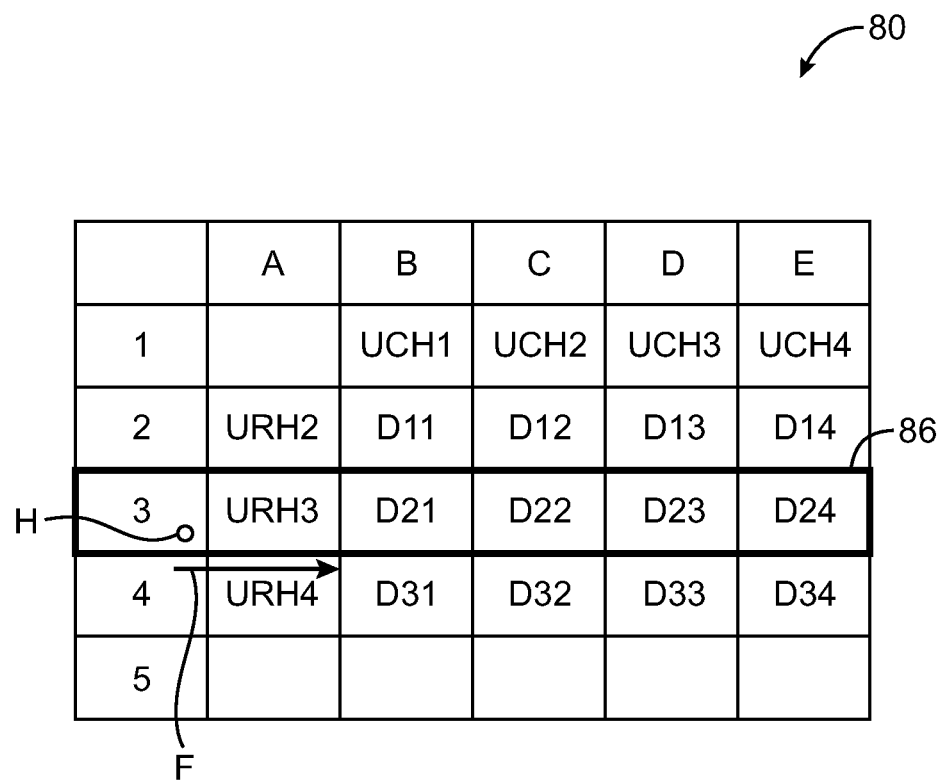
FIG. 18 shows how a row of data may be selected using the hold portion of a hold and rightflick gesture in which the rightflick is made below the hold in accordance with an embodiment of the present invention.
Figure 19:
FIG. 19 shows how a row may be inserted in the table of FIG. 18 after the selected row in response to detection of the hold and rightflick gesture in which the rightflick was made below the hold in accordance with the present invention.

FIG. 18 shows how a hold and lower rightflick gesture may be used to direct computing equipment 12 to select and highlight row 3 in FIG. 18 and to direct computing equipment 12 to insert a row into table 80 after row 3. Hold gesture H may be made on row header 3 to select and highlight row 3. Flick gesture F may be made to the right (i.e., flick gesture F may be a rightflick gesture). Because rightflick gesture F is located below hold gesture H, rightflick gesture F may be referred to as a lower rightflick gesture. The gesture of FIG. 18 may be intuitive to a user, because the user is using a rightflick that is located below (i.e., after) the selected row to direct computing equipment 12 to insert a new row below (i.e., after) the selected row. In response to detecting a hold and lower rightflick gesture of the type shown in FIG. 18, computing equipment 12 may insert a new row into table 80 below row 3 as shown in FIG. 19. When inserting a new row, data for existing rows may be shifted to accommodate the empty cells of the new row. For example, the original entries from row 4 in the table of FIG. 18 (and any subsequent rows) may each be shifted one row down (i.e., so that the row 4 entries are located in row 5, etc.), as shown in FIG. 19.

Figure 20:
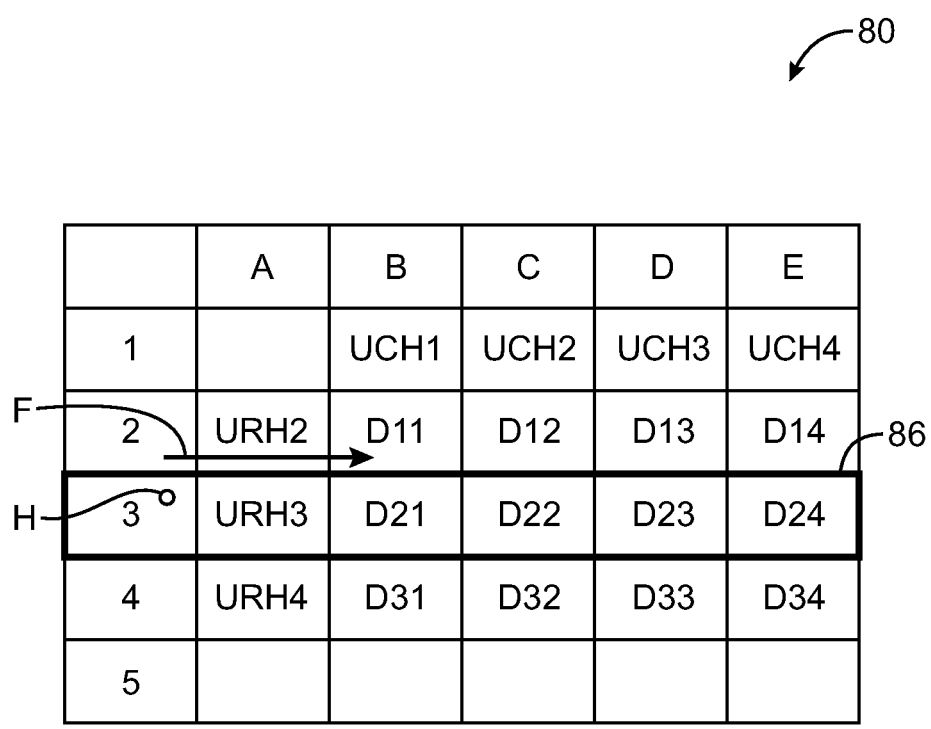
FIG. 20 shows how a row of data may be selected using the hold portion of a hold and rightflick gesture in which the rightflick is made above the hold in accordance with an embodiment of the present invention.

To insert a row before a desired row, the user may use a hold and flick gesture of the type shown in FIG. 20 (i.e., using hold gesture H and simultaneous flick gesture F). In the FIG. 20 example, the hold and flick gesture involves use of a flick gesture F that is made at a position above (before) the hold gesture H. This type of gesture intuitively instructs computing equipment 12 to insert a row above (before) the selected row.

Figure 21:
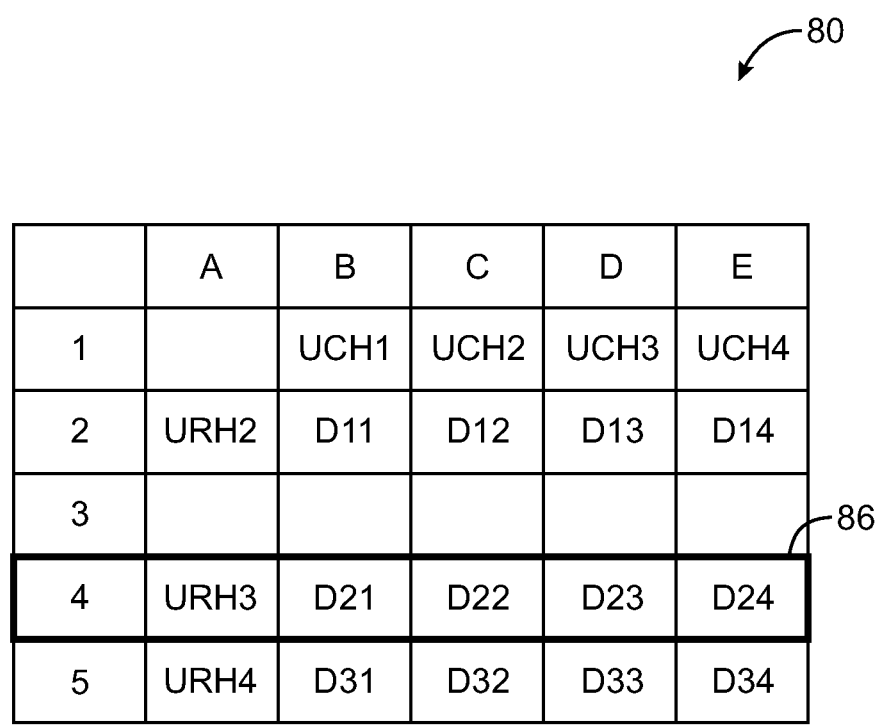
FIG. 21 shows how a row may be inserted in the table of FIG. 20 after the selected row in response to detection of the hold and rightflick gesture in which the rightflick was made above the hold in accordance with the present invention.

As shown in FIG. 20, the user may use hold gesture H on row header 3 to select and highlight row 3. Flick gesture F may be made to the right (i.e., flick gesture F may be a rightflick gesture). Because rightflick gesture F is located above hold gesture H, rightflick gesture F may sometimes be referred to as an upper rightflick gesture. In response to detecting a hold and upper rightflick gesture of the type shown in FIG. 20, computing equipment 12 may insert a new row into table 80 above (before) row 3 as shown in FIG. 21. As when inserting a row above a desired row, data for existing rows may be shifted to accommodate the empty cells of the new row. In particular, the original entries from row 3 in the table of FIG. 20 and any subsequent rows may each be shifted one row down (i.e., so that the row 3 entries are located in row 4, etc.), as shown in FIG. 21.

Figure 22:
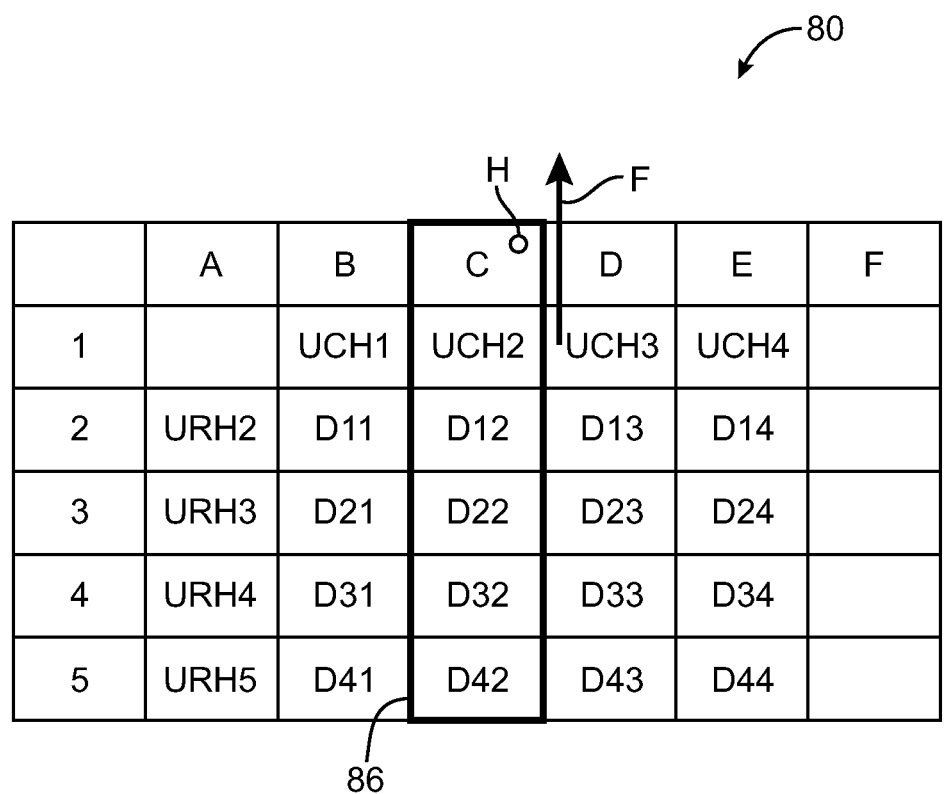
FIG. 22 shows how a column of data may be selected using the hold portion of a hold and right upflick gesture in accordance with an embodiment of the present invention.

A user may use a hold and upflick gesture (e.g., a right upflick gesture) to delete a selected column from table 80. As shown in FIG. 22, for example, a user may use a hold gesture H to direct computing equipment 12 to select and highlight column C for deletion from table 80. The user may make hold gesture H on column header "C." By simultaneously making upflick gesture F (i.e., while maintaining touch with header C using hold gesture H), the user may instruct computing equipment 12 to delete column C from table 80. The use of an upflick gesture to initiate column deletion may be intuitive to a user, because the user is in effect flicking the column out of the table.

In response to detection of the hold gesture portion of the hold and upflick gesture, computing equipment 12 may select column C and may highlight column C as shown in FIG. 22. In respond to the upflick portion of the hold and upflick gesture, computing equipment 12 may delete the selected column (i.e., column C in the FIG. 22 example) and may update database 66 (FIG. 6) accordingly. Columns after the deleted column may be moved over by one column each to fill in the deleted column. For example, after the entries of column C from FIG. 22 have been deleted, the entries from subsequent columns such as columns D and E in FIG. 22 may each be moved one column to the left, as shown in FIG. 23.

If desired, multiple rows or columns may be processed using a hold and flick gesture. Multiple rows or columns may be selected using gestures (e.g., one or more tap gestures each of which selects and highlights one or more rows or columns, multitouch gestures such as pinch gestures that extend over a range or row or column headers or other table elements, etc.). Multiple rows or columns may also be selected by using drop-down menus, menu options, mouse cursor selections, keyboard keys (e.g., in combination with mouse cursor activity or touch gestures such as taps, etc.). The rows or columns that are selected may form a contiguous set (e.g., a range) or selected rows or columns or may contain a collection of non-contiguous rows or columns. Examples in which multiple rows or columns are selected in the form of contiguous rows and columns are sometimes described herein as an example.

As shown in the example of FIG. 24, multiple columns (e.g., columns C and D) may be selected (e.g., using gestures or other user input). A user may select a desired range of columns to delete by making a hold gesture on one of the column headers associated with the desired range of columns. In the FIG. 24 table, for example, the user may select and highlight desired columns (e.g., columns C and D) to form a range of desired columns. The user may use hold gesture H to select the column range (e.g., to select multiple highlighted columns such as columns C and D) and may simultaneously use upflick gesture F (e.g., a right upflick) to instruct computing equipment 12 to delete the selected range of columns (i.e., to delete columns C and D). In response, computing equipment 12 can delete columns C and D, can move the entries of all remaining subsequent columns such as column E of FIG. 24 to the left as far as needed to fill in the missing columns (i.e., to move the entries of column E of FIG. 24 to column C as shown in FIG. 25), and can update database 66 (FIG. 6) accordingly. If desired, a hold and left upflick gesture may be used to select and delete a column or range of columns.

Figure 26:
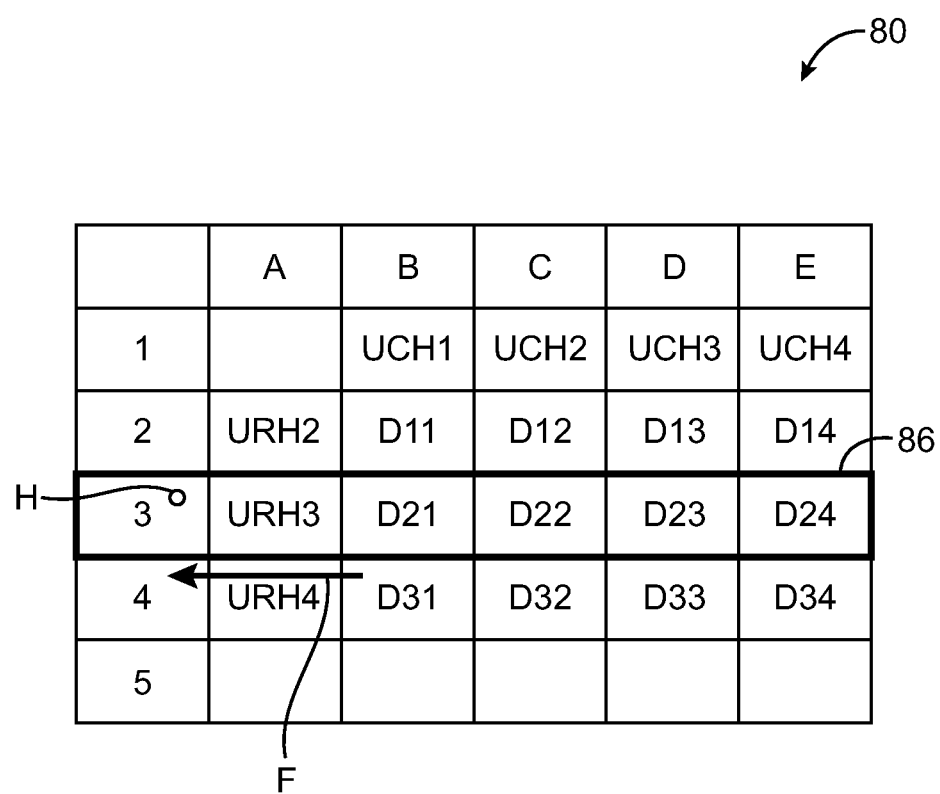
FIG. 26 shows how a hold and leftflick gesture in which the leftflick is made below the hold may be used to instruct a table editing system to delete a selected row in accordance with the present invention.
Figure 27:
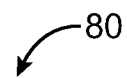
FIG. 27 shows how the selected row of data may be deleted from the table of FIG. 26 in response to detection of the hold and leftflick gesture in accordance with an embodiment of the present invention.

FIG. 26 shows how a user can use a hold and leftflick gesture to delete a desired row from table 80. In the FIG. 26 example, a user has selected row 3 for deletion by making hold gesture H on row header "3." In response to hold gesture H, computing equipment 12 may highlight row 3 using highlight 86. When the user makes simultaneous leftflick gesture F (e.g., a lower leftflick), computing equipment 12 can delete the entries of row 3 from table 80 and can move any subsequent rows in table 80 (e.g., the entries of row 4 in FIG. 26) up one column each, as shown in FIG. 27. A hold and upper leftflick gesture may be used to delete rows from a table if desired. The use of a hold and leftflick gesture to delete rows may be intuitive to a user, because the user is in effect flicking rows out of the table.

Figure 28:
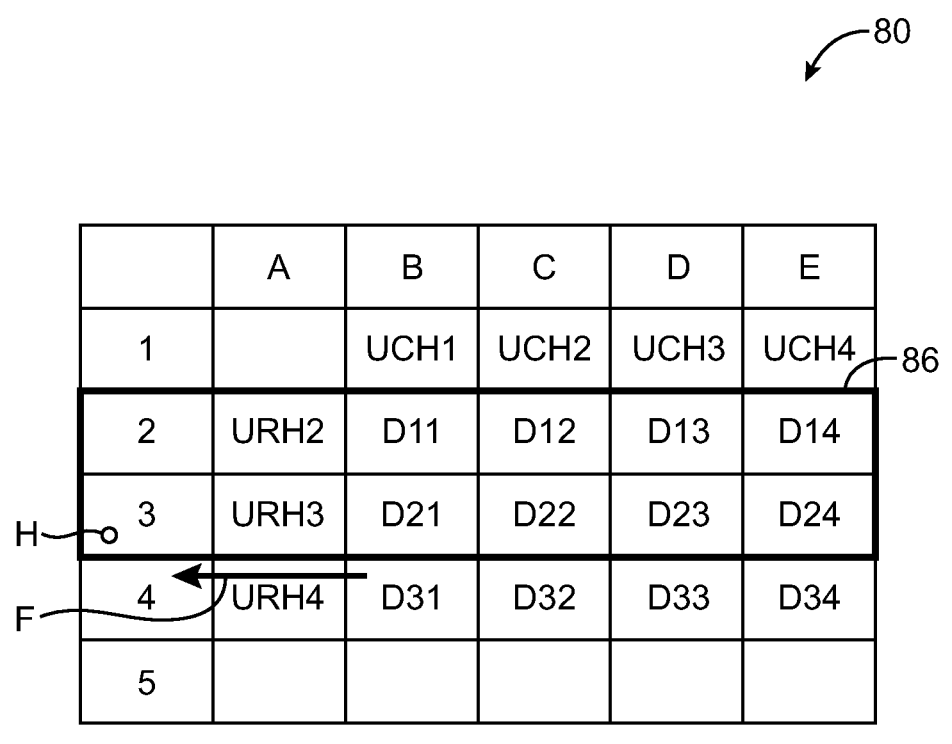

If desired, multiple rows may be deleted using a hold and leftflick gesture. FIG. 28 shows how multiple rows (e.g., a range of contiguous rows such as rows 2 and 3) may be selected and highlighted using highlight 86. Hold and leftflick gesture H and F may be used to instruct computing equipment 12 to remove selected rows 2 and 3 from table 80. The hold and leftflick gesture of FIG. 28 may be, for example, a hold and lower leftflick gesture.

Figure 29:
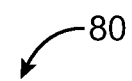
FIG. 29 shows how the selected rows of data may be deleted from the table of FIG. 28 in response to detection of the hold and leftflick gesture in accordance with an embodiment of the present invention.

When multiple rows are deleted in this way, computing equipment 12 can rearrange table 80 accordingly (e.g., by moving all subsequent rows upwards sufficiently in table 80 to fill in any blank cells left by the deleted rows). As shown in FIG. 29, for example, if the user directs computing equipment 12 to delete selected rows 2 and 3 using hold gesture H and lower leftflick gesture F of FIG. 12, the entries of subsequent row 4 from table 80 of FIG. 28 may be moved upwards by two rows to fill in the empty cells in table 80 (see FIG. 29).

In general, any of the table manipulations described herein in connection with columns may be performed by equipment 12 in connection with rows and any of the table manipulations that are described herein in connection with rows may be performed by equipment 12 in connection with columns. The use of various flick gestures to manipulate columns (or rows) in the present examples is merely illustrative.

As described in connection with FIG. 6, updates to the structure of table 80 may be maintained in a database (see, e.g., table content 66) by code 62 in response to user gestures. Updated on-screen data or other output 68 may also be presented to the user, so that the user can continue to make changes if needed.

Figure 30:
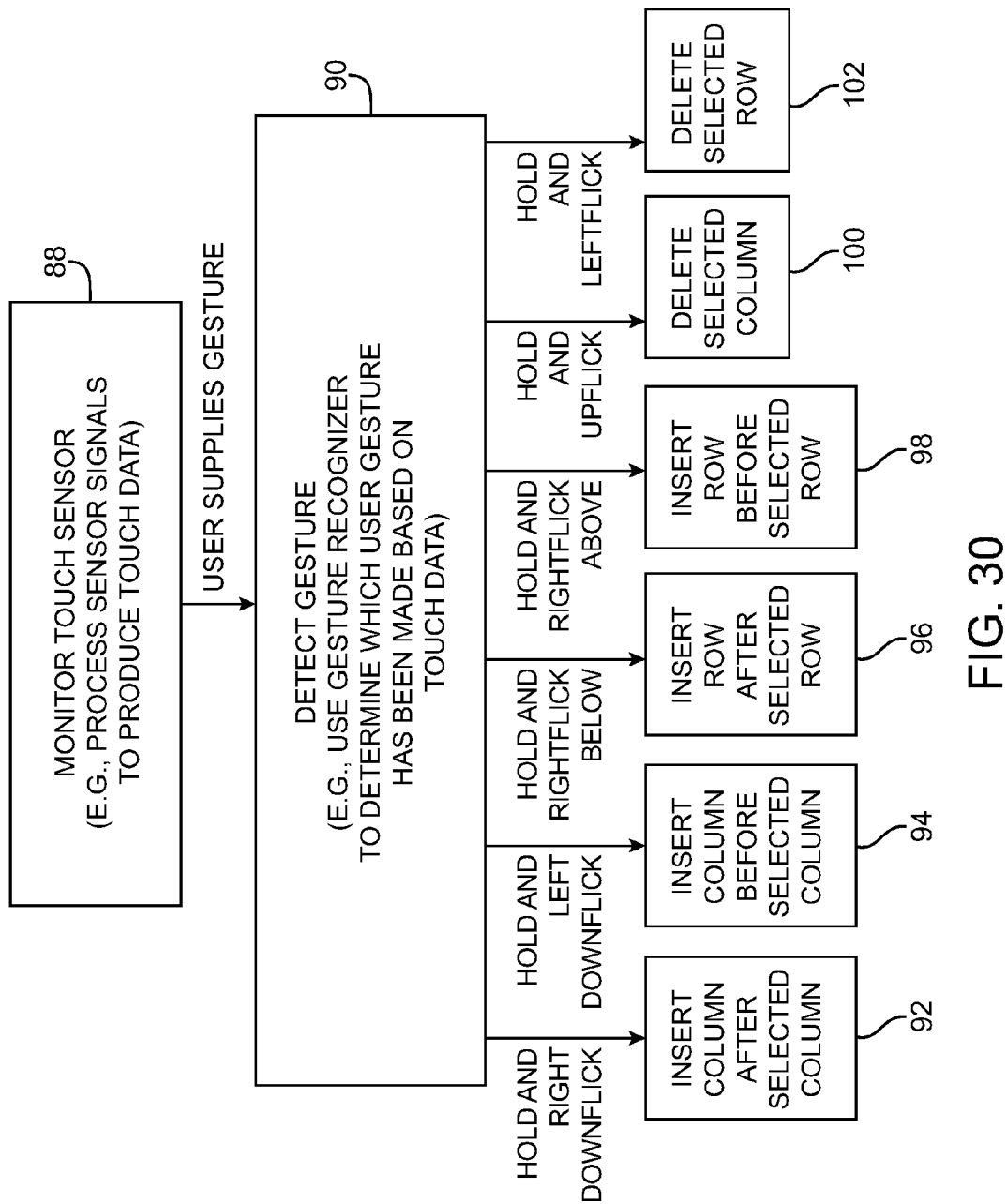
FIG. 30 is a flow chart of illustrative steps involved in using a system of the type shown in FIG. 1 to edit tables having columns and rows of data by performing operations such as row and column deletion and insertion in response to user-supplied touch gestures such as hold and flick gestures in accordance with an embodiment of the present invention.

FIG. 30 shows illustrative steps that may be involved in manipulating table data in response to user touch gestures such as hold and flick gestures. The operations of FIG. 30 may be performed by computing equipment 12 (FIG. 1) using localized or distributed code (e.g., locally executed code on a single device or code running in a client-server configuration over a network). Gesture data may be gathered locally (e.g., in the same device that contains the storage and processing circuitry on which the code is executed) or gesture data may be gathered remotely (e.g., with a coupled accessory, a remote client, etc.). Output may be supplied using a local display, local printer, remote display, remote printer, or other suitable input-output devices.

As shown in FIG. 30, a touch sensor array may be used to monitor user input. The touch sensor array may, as an example, be associated with touch screen 30 of FIG. 2. Touch sensor notifier 58 (FIG. 5) or other suitable touch event detection software may be used in gathering touch event data from the touch sensor array and in providing touch event data to gesture recognizer 60. User input may be provided in the form of touch gestures. For example, user input may be provided in the form of hold and flick gestures (e.g., hold and leftflick gestures such as hold and upper leftflick and hold and lower leftflick, hold and rightflick gestures such as hold and upper rightflick and hold and lower rightflick, hold and upflick gestures such as hold and right upflick and hold and left upflick, and hold and downflick gestures such as hold and right downflick and hold and left downflick). Other gestures and other types of user input may be used in connection with hold and flick gestures if desired.

The hold portion of a hold and flick gesture may be made at a location in a touch sensor array that overlaps a row or column header in a table or other suitable table location that indicates to computing equipment 12 that the user is interested in selecting and highlighting a row (or range or rows) or a column (or range of columns) for deletion or for adjacent row or column insertion.

When a user enters a gesture, the gesture may be detected by the touch sensor array at step 90 (e.g., capacitance changes may be sensed in an array of capacitive touch sensor electrodes using touch sensor circuitry 53 of FIG. 3, etc.) and appropriate gesture data may be supplied at the output of gesture recognizer 60. Operating system 52, application 54, or other code 62 may receive the gesture data (see, e.g., FIG. 6) and may take appropriate actions (e.g., by adjusting the pattern of image pixels 49 in display 30 that are used to present information to the user). For example, if the hold portion of a hold and flick gesture is detected, code 62 on computing equipment 12 may highlight and select a row(s) or column(s) of table 80 or may otherwise produce a visual representation on display 30 (FIG. 2) to indicate to the user which of the rows or columns of the table have been selected. During at least part of the hold gesture that is used to direct computing equipment 12 to select and highlight desired rows or columns in table 80, the user may make a flick gesture that directs computing equipment 12 to delete the selected row(s) or column(s) or that directs computing equipment 12 to insert rows or columns into the table.

The type of action that is taken in response to detection of a flick gesture that overlaps (i.e., that is simultaneous with) the hold gesture, may depend on the direction of the flick gesture (i.e., to the left in a leftflick, to the right in a rightflick, up in an upflick, or down in a downflick) and the relative position of the flick compared to the position of the hold (i.e., "before the hold" as when a flick is made to the left of a hold on a column header or as when a flick is made above a hold gesture being made on a row header or "after the hold" as when a flick is made to the right of a hold that is being made on a column header or as when a flick is being made below a hold gesture that is being made on a row header).

In response to detection of a hold and right downflick gesture, computing equipment 12 may insert a column after (to the right of) a selected column (step 92), as described in connection with FIGS. 13 and 14.

In response to detection of a hold and left downflick gesture, computing equipment 12 may insert a column before (to the left of) a selected column (step 94), as described in connection with FIGS. 15 and 16.

In response to detection of a hold and lower rightflick gesture (i.e., a rightflick made below/after the hold), computing equipment 12 may insert a row after (below) a selected row (step 96), as described in connection with FIGS. 18 and 19.

In response to detection of a hold and upper rightflick gesture (i.e., a rightflick made before/above the hold), computing equipment 12 may insert a row before (above) a selected row (step 98), as described in connection with FIGS. 20 and 21.

In response to detection of a hold and upflick gesture (e.g., a left upflick or a right upflick), computing equipment 12 may delete a selected column (step 100), as described in connection with FIGS. 22 and 23. If multiple columns are selected, the upflick can be used to delete multiple columns, as described in connection with FIGS. 24 and 25.

In response to detection of a hold and leftflick gesture (e.g., an upper leftflick or a lower leftflick), computing equipment 12 may delete a selected row (step 102), as described in connection with FIGS. 26 and 27. If multiple rows are selected, the upflick can be used to delete multiple rows, as described in connection with FIGS. 28 and 29.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a display;
   a touch sensitive surface;
   one or more processors;
   memory; and
   one or more programs, wherein the one or more programs are stored in the memory and configured to be executed by the one or more processors, the one or more programs including instructions for:
      displaying a table of data that includes a plurality of rows and a plurality of columns with corresponding column headers;
      detecting a first contact on the touch-sensitive surface at a location that represents a respective column header of a respective column in the table on the display;
      while detecting the first contact on the touch-sensitive surface at the location that represents the respective column header of the respective column in the table, concurrently detecting a first flick gesture that includes:
         detecting a second contact on the touch-sensitive surface at a location that is remote from the respective column and the respective column header; and
         detecting movement of the second contact in a respective direction on the touch-sensitive surface; and
      in response to detecting the first flick gesture concurrently with the first contact, performing a first operation associated with the respective column, wherein the first operation includes performing one of: inserting an entire column into the table or deleting an entire column from the table.

2. The electronic device of claim 1, wherein the one or more programs include instructions for, in response to detecting the first contact on the touch-sensitive surface at the location that represents the respective column header of the respective column in the table, selecting the respective column.

3. The electronic device of claim 1, wherein the one or more programs include instructions for, in response to selecting the respective column, visually highlighting the respective column in the table.

4. The electronic device of claim 1, wherein performing the first operation includes:
   in accordance with a determination that the respective direction of the movement of the second contact is a first direction, inserting an additional column next to the respective column; and
   in accordance with a determination that the respective direction of the movement of the second contact is a second direction that is different from the first direction, deleting the respective column.

5. The electronic device of claim 4, wherein:
   the first direction corresponds to downward movement on the display; and
   the second direction corresponds to upward movement on the display.

6. The electronic device of claim 1, wherein:
   the first operation includes inserting an additional column next to the respective column; and
   in accordance with a determination that the first flick gesture is detected to the right of the respective column, the additional column is inserted to the right of the respective column; and
   in accordance with a determination that the first flick gesture is detected to the left of the respective column, the additional column is inserted to the left of the respective column.

7. The electronic device of claim 1, wherein:
   the first flick gesture is detected while a plurality of columns, including the respective column, are selected; and
   in accordance with a determination that the respective direction of the movement of the second contact is a first direction, inserting a number of columns that is equal to the number of columns in the plurality of columns next to the respective column; and
   in accordance with a determination that the respective direction of the movement of the second contact is a second direction that is different from the first direction, deleting the plurality of columns.

8. The electronic device of claim 1, wherein the one or more programs include instructions for, after performing the first operation:
   detecting a third contact on the touch-sensitive surface at a location that represents a respective row header of a respective row in the table on the display;
   while detecting the third contact on the touch-sensitive surface at the location that represents the respective row header of the respective row in the table, concurrently detecting a second flick gesture that includes:
      detecting a fourth contact on the touch-sensitive surface at a location that is remote from the respective row and the respective row header; and
      detecting movement of the fourth contact in a respective direction on the touch-sensitive surface; and
   in response to detecting the second flick gesture concurrently with the third contact, performing a second operation associated with the respective row.

9. The electronic device of claim 1, wherein performing the first operation includes:
   in accordance with a determination that the respective direction of the movement of the second contact is a first substantially vertical direction, inserting an additional new column next to the respective column; and
   in accordance with a determination that the respective direction of the movement of the second contact is a second substantially vertical direction that is opposite from the first substantially vertical direction, deleting the respective column.

10. A method including:
    at an electronic device with a touch-sensitive surface and a display:
       displaying a table of data that includes a plurality of rows and a plurality of columns with corresponding column headers;
       detecting a first contact on the touch-sensitive surface at a location that represents a respective column header of a respective column in the table on the display;

while detecting the first contact on the touch-sensitive surface at the location that represents the respective column header of the respective column in the table, concurrently detecting a first flick gesture that includes:
  detecting a second contact on the touch-sensitive surface at a location that is remote from the respective column and the respective column header; and
  detecting movement of the second contact in a respective direction on the touch-sensitive surface; and
in response to detecting the first flick gesture concurrently with the first contact, performing a first operation associated with the respective column, wherein the first operation includes performing one of: inserting an entire column into the table or deleting an entire column from the table.

11. The method of claim 10, including, in response to detecting the first contact on the touch-sensitive surface at the location that represents the respective column header of the respective column in the table, selecting the respective column.

12. The method of claim 10, including, in response to selecting the respective column, visually highlighting the respective column in the table.

13. The method of claim 10, wherein performing the first operation includes:
  in accordance with a determination that the respective direction of the movement of the second contact is a first direction, inserting an additional column next to the respective column; and
  in accordance with a determination that the respective direction of the movement of the second contact is a second direction that is different from the first direction, deleting the respective column.

14. The method of claim 13, wherein:
  the first direction corresponds to downward movement on the display; and
  the second direction corresponds to upward movement on the display.

15. The method of claim 10, wherein:
  the first operation includes inserting an additional column next to the respective column; and
  in accordance with a determination that the first flick gesture is detected to the right of the respective column, the additional column is inserted to the right of the respective column; and
  in accordance with a determination that the first flick gesture is detected to the left of the respective column, the additional column is inserted to the left of the respective column.

16. The method of claim 10, wherein:
  the first flick gesture is detected while a plurality of columns, including the respective column, are selected; and
  in accordance with a determination that the respective direction of the movement of the second contact is a first direction, inserting a number of columns that is equal to the number of columns in the plurality of columns next to the respective column; and
  in accordance with a determination that the respective direction of the movement of the second contact is a second direction that is different from the first direction, deleting the plurality of columns.

17. The method of claim 10, including, after performing the first operation:
  detecting a third contact on the touch-sensitive surface at a location that represents a respective row header of a respective row in the table on the display;
  while detecting the third contact on the touch-sensitive surface at the location that represents the respective row header of the respective row in the table, concurrently detecting a second flick gesture that includes:
    detecting a fourth contact on the touch-sensitive surface at a location that is remote from the respective row and the respective row header; and
    detecting movement of the fourth contact in a respective direction on the touch-sensitive surface; and
  in response to detecting the second flick gesture concurrently with the third contact, performing a second operation associated with the respective row.

18. The method of claim 10, wherein performing the first operation includes:
  in accordance with a determination that the respective direction of the movement of the second contact is a first substantially vertical direction, inserting an additional new column next to the respective column; and
  in accordance with a determination that the respective direction of the movement of the second contact is a second substantially vertical direction that is opposite from the first substantially vertical direction, deleting the respective column.

19. A non-transitory computer readable storage medium storing one or more programs, the one or more programs comprising instructions, which when executed by an electronic device with a display and a touch-sensitive surface, cause the device to:
  display a table of data that includes a plurality of rows and a plurality of columns with corresponding column headers;
  detect a first contact on the touch-sensitive surface at a location that represents a respective column header of a respective column in the table on the display;
  while detecting the first contact on the touch-sensitive surface at the location that represents the respective column header of the respective column in the table, concurrently detect a first flick gesture that includes:
    detecting a second contact on the touch-sensitive surface at a location that is remote from the respective column and the respective column header; and
    detecting movement of the second contact in a respective direction on the touch-sensitive surface; and
  in response to detecting the first flick gesture concurrently with the first contact, perform a first operation associated with the respective column, wherein the first operation includes performing one of: inserting an entire column into the table or deleting an entire column from the table.

20. The non-transitory computer readable storage medium of claim 19, including instructions to, in response to detecting the first contact on the touch-sensitive surface at the location that represents the respective column header of the respective column in the table, select the respective column.

21. The non-transitory computer readable storage medium of claim 19, including instructions to, in response to selecting the respective column, visually highlight the respective column in the table.

22. The non-transitory computer readable storage medium of claim 19, wherein performing the first operation includes:
  in accordance with a determination that the respective direction of the movement of the second contact is a first direction, inserting an additional column next to the respective column; and
  in accordance with a determination that the respective direction of the movement of the second contact is a second direction that is different from the first direction, deleting the respective column.

23. The non-transitory computer readable storage medium of claim 22, wherein:
the first direction corresponds to downward movement on the display; and
the second direction corresponds to upward movement on the display.

24. The non-transitory computer readable storage medium of claim 19, wherein:
the first operation includes inserting an additional column next to the respective column; and
in accordance with a determination that the first flick gesture is detected to the right of the respective column, the additional column is inserted to the right of the respective column; and
in accordance with a determination that the first flick gesture is detected to the left of the respective column, the additional column is inserted to the left of the respective column.

25. The non-transitory computer readable storage medium of claim 19, wherein:
the first flick gesture is detected while a plurality of columns, including the respective column, are selected; and
in accordance with a determination that the respective direction of the movement of the second contact is a first direction, inserting a number of columns that is equal to the number of columns in the plurality of columns next to the respective column; and
in accordance with a determination that the respective direction of the movement of the second contact is a second direction that is different from the first direction, deleting the plurality of columns.

26. The non-transitory computer readable storage medium of claim 19, including instructions to, after performing the first operation:
detect a third contact on the touch-sensitive surface at a location that represents a respective row header of a respective row in the table on the display;
while detecting the third contact on the touch-sensitive surface at the location that represents the respective row header of the respective row in the table, concurrently detect a second flick gesture that includes:
detecting a fourth contact on the touch-sensitive surface at a location that is remote from the respective row and the respective row header; and
detecting movement of the fourth contact in a respective direction on the touch-sensitive surface; and
in response to detecting the second flick gesture concurrently with the third contact, perform a second operation associated with the respective row.

27. The non-transitory computer readable storage medium of claim 19, wherein performing the first operation includes:
in accordance with a determination that the respective direction of the movement of the second contact is a first substantially vertical direction, inserting an additional new column next to the respective column; and
in accordance with a determination that the respective direction of the movement of the second contact is a second substantially vertical direction that is opposite from the first substantially vertical direction, deleting the respective column.

* * * * *